(12) United States Patent
Kamae et al.

(10) Patent No.: US 10,451,990 B2
(45) Date of Patent: Oct. 22, 2019

(54) TONER AND METHOD FOR PRODUCING TONER

(71) Applicant: CANON KABUSHIKI KAISHA, Tokyo (JP)

(72) Inventors: Kentaro Kamae, Kashiwa (JP); Ryuji Murayama, Nagareyama (JP); Junichi Tamura, Toride (JP); Hayato Ida, Toride (JP); Takashi Hirasa, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/136,676

(22) Filed: Sep. 20, 2018

(65) Prior Publication Data
US 2019/0113858 A1  Apr. 18, 2019

(30) Foreign Application Priority Data
Oct. 12, 2017 (JP) ................... 2017-198451

(51) Int. Cl.
| G03G 9/113 | (2006.01) |
| G03G 9/08 | (2006.01) |
| G03G 9/093 | (2006.01) |
| G03G 9/087 | (2006.01) |
| G03G 9/107 | (2006.01) |
| G03G 9/097 | (2006.01) |

(52) U.S. Cl.
CPC ......... *G03G 9/1133* (2013.01); *G03G 9/0804* (2013.01); *G03G 9/0806* (2013.01); *G03G 9/0821* (2013.01); *G03G 9/08728* (2013.01); *G03G 9/08795* (2013.01); *G03G 9/09321* (2013.01); *G03G 9/09733* (2013.01); *G03G 9/107* (2013.01)

(58) Field of Classification Search
CPC ............... G03G 9/1133; G03G 9/0804; G03G 9/09321; G03G 9/08795; G03G 9/08728; G03G 9/107; G03G 9/09733; G03G 9/0821; G03G 9/0806
See application file for complete search history.

(56) References Cited

U.S. PATENT DOCUMENTS

| 8,084,174 | B2 | 12/2011 | Hasegawa et al. |
| 8,323,726 | B2 | 12/2012 | Naka et al. |
| 8,921,023 | B2 | 12/2014 | Baba et al. |
| 8,927,188 | B2 | 1/2015 | Naka et al. |
| 8,974,994 | B2 | 3/2015 | Kamae et al. |
| 8,986,914 | B2 | 3/2015 | Fujikawa et al. |
| 9,057,970 | B2 | 6/2015 | Ida et al. |
| 9,058,924 | B2 | 6/2015 | Komatsu et al. |
| 9,063,443 | B2 | 6/2015 | Ishigami et al. |
| 9,348,247 | B2 | 5/2016 | Ida et al. |
| 9,540,483 | B2 | 1/2017 | Ida et al. |
| 9,665,023 | B2 | 5/2017 | Kamae et al. |
| 9,696,644 | B2 | 7/2017 | Ida et al. |
| 9,897,934 | B2 | 2/2018 | Tamura et al. |
| 9,915,885 | B2 | 3/2018 | Katsumata et al. |
| 9,958,800 | B2 * | 5/2018 | Chimoto .............. G03G 9/0804 |
| 9,969,834 | B2 | 5/2018 | Ohtsu et al. |
| 10,012,918 | B2 | 7/2018 | Ishigami et al. |
| 10,012,920 | B2 | 7/2018 | Shibata et al. |
| 10,012,921 | B2 | 7/2018 | Kamae et al. |
| 10,078,281 | B2 | 9/2018 | Ida et al. |
| 10,088,765 | B2 | 10/2018 | Miyakai et al. |
| 2003/0065103 | A1 * | 4/2003 | Chou ............... C09D 123/0876 525/330.2 |
| 2013/0108955 | A1 | 5/2013 | Shibata et al. |
| 2013/0202998 | A1 | 8/2013 | Higashi et al. |
| 2013/0244159 | A1 | 9/2013 | Ishigami et al. |
| 2014/0134535 | A1 | 5/2014 | Baba et al. |
| 2015/0024320 | A1 | 1/2015 | Tanaka |
| 2015/0099227 | A1 | 4/2015 | Ida et al. |
| 2017/0269493 | A1 | 9/2017 | Ohtsu et al. |
| 2018/0031990 | A1 | 2/2018 | Kamae et al. |
| 2018/0052402 | A1 | 2/2018 | Iwasaki et al. |
| 2018/0067410 | A1 | 3/2018 | Yamashita et al. |
| 2018/0149990 | A1 | 5/2018 | Onozaki et al. |
| 2018/0149992 | A1 | 5/2018 | Onozaki et al. |
| 2018/0203370 | A1 | 7/2018 | Tamura et al. |
| 2018/0275540 | A1 | 9/2018 | Matsuo et al. |

FOREIGN PATENT DOCUMENTS

| JP | 2002-108019 | 4/2002 |
| JP | 2011-128410 | 6/2011 |
| JP | 2015-022237 | 2/2015 |

OTHER PUBLICATIONS

U.S. Appl. No. 15/988,116, Naohiko Tsuchida, filed Mar. 13, 2017.
U.S. Appl. No. 16/056,630, Kentaro Kamae, filed Jul. 27, 2017.

* cited by examiner

*Primary Examiner* — Thorl Chea
(74) *Attorney, Agent, or Firm* — Venable LLP

(57) ABSTRACT

A toner comprising a toner particle including a resin component, wherein the resin component includes an olefin copolymer including ester group having specific structures Y1 and Y2 and an olefin copolymer including acid group having an acid value of from 50 mg KOH/g to 300 mg KOH/g, the amount of the olefin copolymer including ester group is 50% by mass or more, the toner particle has a surface layer including the olefin copolymer including acid group which has formed a salt with a metal, the metal is at least one metal selected from the group consisting of Mg, Ca, Sr, Al, and Zn, and the total amount of the metal in the toner is from 25 ppm to 500 ppm.

8 Claims, No Drawings

TONER AND METHOD FOR PRODUCING TONER

BACKGROUND OF THE INVENTION

Field of the Invention

The present invention relates to a toner suitable for an electrophotographic method, an electrostatic recording method, an electrostatic printing method, and the like, and a method for producing the toner.

Description of the Related Art

In recent years, following a widespread use of electrophotographic full-color copying machines, a demand has grown not only for higher speed and higher image quality but also for improvement of additional performance such as energy saving performance and color stability performance and reduction of maintenance cost such as implementation of maintenance-free performance.

As a specific energy saving measure, a toner that can be fixed at a lower temperature is required in order to lower power consumption in the fixing step.

Accordingly, in Japanese Patent Application Laid-open (JP-A) No. 2015-022237, a toner using an ethylene-methacrylic acid resin having a low glass transition temperature has been suggested in order to achieve low-temperature fixation.

Further, as a specific measure for color stabilization, a toner with a stable charge quantity is needed in order to stabilize the development efficiency even in a long-term image output.

Accordingly, in JP-A No. 2002-108019, a toner in which the amount of metal in the toner is controlled and which is provided with a leak point is suggested for suppressing the charge-up of the toner.

In addition, as a specific measure ensuring maintenance-free operation, a toner that is unlikely to deteriorate even in a long-term image output is required in order to suppress the frequency of developer replacement by a serviceman.

Accordingly, it has been suggested to use a thermoplastic elastomer resin having rubber elasticity in order to prevent inorganic fine particles, which have been introduced as spacers, from being embedded in the toner surface even in a long-term image output, thereby preventing the flowability and attachment property of the toner from changing. JP-A No. 2011-128410 suggests a toner including an ethylene-based ester group-containing copolymer such as ethylene-vinyl acetate copolymer and an ethylene-methyl acrylate copolymer as the thermoplastic elastomer resin having rubber elasticity.

SUMMARY OF THE INVENTION

However, although the toner disclosed in JP-A No. 2015-022237 includes a resin having a low glass transition temperature as typified by an ethylene-methacrylic acid resin, since a thermosetting resin is used for the shell layer, there are cases in which although excellent hot offset resistance is attained, low-temperature fixability, which is the initial objective is degraded.

Meanwhile, with the toner disclosed in JP-A No. 2002-108019, although the charge-up of the toner can be suppressed, under high-temperature and high-humidity environment, hygroscopicity is high because the main binder is a styrene acrylic resin, and the charge of the toner, in combination with the contained metal, is likely to leak.

Therefore, when a copying machine is actuated after being allowed to stand for a long time in an environment where the air-conditioning equipment has been switched off, such as after a long vacation in the summer, since the charge quantity of the toner decreases, the image density sometimes becomes too high. Further, since the charge quantity of the toner is gradually restored each time the image output proceeds, the color tone may change. In addition, since the toner holding force created by electrostatic attraction of magnetic carrier is weak, toner scattering occurs and the interior of the copying machine may be contaminated.

Meanwhile, in the toner disclosed in JP-A No. 2011-128410, the ethylene-based ester group-containing copolymer is present in the surface layer of the toner particle. Since the ethylene-based ester group-containing copolymer has a high volume resistance, charges generated by triboelectric charging tend to be localized. As a result, the electrostatic attachment force of the toner to an electrostatic latent image carrier may increase, the transfer efficiency may decrease, and the image quality density may decrease. Furthermore, although the glass transition temperature of the main binder is low, since there is no polar group having an affinity for paper, low-temperature fixability is poor.

As described above, it is an urgent task to develop a toner which excels in low-temperature fixability and hot offset resistance, which are in a trade-off relationship with each other, has stable charge quantity of the toner and maintains excellent color stability even in image output after a long period of stoppage, enables uniform distribution of charges generated by triboelectric charging on the toner particles surface, and exhibits excellent transferability.

The present invention provides a toner comprising a toner particle including a resin component, wherein the resin component includes an olefin copolymer including ester group and an olefin copolymer including acid group, the olefin copolymer including ester group has a structure Y1 represented by formula (1) below, and at least one structure Y2 selected from the group consisting of a structure represented by formula (2) below and a structure represented by formula (3) below, the olefin copolymer including acid group has an acid value of from 50 mg KOH/g to 300 mg KOH/g, an amount of the olefin copolymer including ester group is 50% by mass or more based on a total mass of the resin component, the toner particle has a surface layer including the olefin copolymer including acid group which has formed a salt with a metal, the metal is at least one metal selected from the group consisting of Mg, Ca, Sr, Al, and Zn, and a total amount of the metal in the toner is from 25 ppm to 500 ppm on a mass basis.

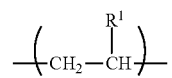

(1)

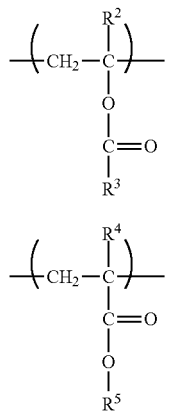

(wherein $R^1$ represents H or $CH_3$, $R^2$ represents H or $CH_3$, $R^3$ represents $CH_3$ or $C_2H_5$, $R^4$ represents H or $CH_3$, and $R^5$ represents $CH_3$ or $C_2H_5$)

The present invention also relates to a method for producing a toner comprising a toner particle including a resin component, the method including the steps of:

preparing a resin fine particle dispersion liquid;

adding a flocculant to the resin fine particle dispersion liquid to form aggregate particles; and heating and fusing the aggregate particles to obtain a dispersion liquid including toner particles, wherein the resin component contains an olefin copolymer including ester group and an olefin copolymer including acid group, the olefin copolymer including ester group has a structure Y1 represented by formula (1) above, and at least one structure Y2 selected from the group consisting of a structure represented by formula (2) above and a structure represented by formula (3) above, the olefin copolymer including acid group has an acid value of from 50 mg KOH/g to 300 mg KOH/g, an amount of the olefin copolymer including ester group is 50% by mass or more based on a total mass of the resin component, the toner particle has a surface layer including the olefin copolymer including acid group which has formed a salt with a metal, the metal is at least one metal selected from the group consisting of Mg, Ca, Sr, Al, and Zn, and a total amount of the metal in the toner is from 25 ppm to 500 ppm on a mass basis.

According to the present invention, it is possible to provide a toner which excels in low-temperature fixability and hot offset resistance, has stable charge quantity of the toner and maintains excellent color stability even in image output after a long period of stoppage, enables uniform distribution of charges generated by triboelectric charging on the toner particles surface, and exhibits excellent transferability.

Further features of the present invention will become apparent from the following description of exemplary embodiments.

DESCRIPTION OF THE EMBODIMENTS

In the present invention, the expression "from AA to BB" and "AA to BB" representing a numerical range means a numerical range including a lower limit and an upper limit which are endpoints, unless otherwise specified.

The toner of the present invention has a toner particle including a resin component, wherein the resin component includes an olefin copolymer including ester group and an olefin copolymer including acid group, the olefin copolymer including ester group has a structure Y1 represented by formula (1) below, and at least one structure Y2 selected from the group consisting of a structure represented by formula (2) below and a structure represented by formula (3) below;

the olefin copolymer including acid group has an acid value of from 50 mg KOH/g to 300 mg KOH/g;

an amount of the olefin copolymer including ester group is 50% by mass or more based on a total mass of the resin component;

the toner particle has a surface layer including the olefin copolymer including acid group which has formed a salt with a metal;

the metal is at least one metal selected from the group consisting of Mg, Ca, Sr, Al, and Zn; and a total amount of the metal in the toner is from 25 ppm to 500 ppm on a mass basis.

As described above, the ethylene-methacrylic acid resin used as the main binder in the toner disclosed in JP-A No. 2015-022237 has a low glass transition temperature and has a polar group having high affinity for paper. Therefore, unless a usage method that impairs the performance of the ethylene-methacrylic acid resin is selected, such as forming a shell with a thermosetting resin as disclosed in JP-A No. 2015-022237, excellent low-temperature fixability can be exhibited.

Meanwhile, since the ethylene-methacrylic acid resin has a high volume resistance, charges generated by triboelectric charging tend to be localized. When the shell as described above is present on the surface of the toner particle, the electrostatic attachment force of the toner to the electrostatic latent image carrier may increase, the transfer efficiency may decrease, and the image quality density may decrease. Further, the ethylene-methacrylic acid resin has a melting point and where the resin melts, viscous stress sharply decreases, so that the hot offset resistance may also decrease.

It follows from the above that there is room for improvement in low-temperature fixability, hot offset resistance, and transferability of a toner using an ethylene-methacrylic acid resin as a binder resin.

Accordingly, the inventors of the present invention have studied toners exhibiting excellent low-temperature fixability, hot offset resistance, charge retention property, and transferability. As a result, the inventors of the present invention have found that the abovementioned problems can be resolved by orienting (arranging) an olefin copolymer including acid group which has formed a salt with a metal in the surface layer of the toner particle, while using an olefin copolymer including ester group as the main binder, and also controlling the amount of polyvalent metal ions in the toner.

The reason therefor is apparently in a hydrophobic matrix and hydrophilic domains of a salt of an acid group and a polyvalent metal ion located in the matrix, which are formed as a result of orienting, on the surface of a toner particle, an olefin copolymer including acid group having a combination of a highly hydrophobic olefin portion and an acid group capable of forming a salt with a polyvalent metal ion.

A problem associated with olefin copolymer including acid group is that because of high volume resistance thereof, charges generated by triboelectric charging are localized. By contrast, as a result of uniformly forming a hydrophobic and hydrophilic domain-matrix structure in the toner particle surface layer, charges generated by triboelectric charging can be uniformly distributed on the toner particles surface and excellent transferability can be obtained.

As for the hot offset resistance which is another problem associated with the olefin copolymer including acid group, it is conceivable that a crosslinked structure is formed on the toner particle surface layer by salt formation between the polyvalent metal ion and the acid group, whereby excellent hot offset resistance is obtained.

Furthermore, in the fixing step accompanied by toner particle deformation, the olefin copolymer including acid group forms a highly compatible state due to the similarity of the structure to that of the olefin copolymer including ester group. It is conceivable that this is why high hot offset resistance is exhibited even though the olefin copolymer including ester group melting at a low temperature is used as the main binder.

Furthermore, with respect to low-temperature fixability that is in a trade-off relationship with hot offset resistance, owing to high hydrophobicity of the olefin portion of the olefin copolymer including acid group, crosslinking caused by salt formation between the polyvalent metal ion and the acid group can be present as a microdomain. Therefore, it is conceivable that compatibility with hot offset resistance can be achieved without impairing low-temperature fixability.

Also regarding the charge retention property which causes concern due to salt formation with the metal ion, it is conceivable that since the salt of the polyvalent metal ion and the acid group can be made to be present as a microdomain, excellent charge retention property is obtained.

The toner of the present invention includes, as a resin component, an olefin copolymer including ester group and an olefin copolymer including acid group. Since the olefin copolymer including ester group does not form a salt with a polyvalent metal ion and is present as a resin component maintaining a low-softening-point state, excellent low-temperature fixability can be obtained. Further, since the olefin copolymer including ester group exhibits high hydrophobicity, excellent charge retention property can be obtained.

Further, since the olefin copolymer including acid group has a combination of a highly hydrophobic olefin portion and an acid group capable of forming a salt with the polyvalent metal ion, this copolymer forms a salt with the polyvalent metal ion, and salt domains can be formed in a hydrophobic matrix. Therefore, it is possible to obtain excellent charge rising performance and charge retention property. Furthermore, as a result of producing the toner particle in an aqueous medium, the olefin copolymer including acid group is likely to be oriented on the surface of the toner particle, and remarkably excellent charge rising performance and charge retention property can be exhibited.

In addition, since the hydrophobic and hydrophilic domain-matrix structure is uniformly formed in the toner particle surface layer, charges generated by triboelectric charging are uniformly distributed on the surface of the toner particle, and excellent transferability can be exhibited.

Furthermore, a crosslinked structure is formed in the toner particle surface layer by salt formation between the polyvalent metal ion and the acid group. When the toner is fused in the image output fixing step, the olefin copolymer including acid group forms a compatible state with the olefin copolymer including ester group while the crosslinking structure makes it possible to obtain high hot offset resistance.

Meanwhile, when an olefin copolymer including ester group is not contained as the resin component, there is no resin component which does not form a salt with the polyvalent metal ion or maintains a low softening point state, so that excellent low-temperature fixability cannot be obtained. Furthermore, since the hydrophobicity of the olefin copolymer including ester group is not exhibited and the above-described hydrophilic domains of the salt of the acid group and the polyvalent metal ion are in excess, excellent charge retention property cannot be obtained.

Further, when the olefin copolymer including acid group is not contained as the resin component, the domain-matrix structure is not uniformly formed in the surface layer of the toner particle, so that excellent charge rising performance cannot be obtained. In addition, since the charges generated by triboelectric charging are localized on the toner particle surface, excellent transferability cannot be obtained. Furthermore, since there are no crosslinked domains created by salt formation between the polyvalent metal ion and the acid group, excellent hot offset resistance cannot be obtained.

In addition, the olefin copolymer including ester group has the structure Y1 represented by the formula (1) and at least one structure Y2 selected from the group consisting of a structure represented by the formula (2) and a structure represented by the formula (3). When the olefin copolymer including ester group has the structures Y1 and Y2, excellent low-temperature fixability can be obtained for the reason described hereinbelow.

Hereinafter, the structure Y2 will be described in detail. The olefin copolymer including ester group is preferably the following polymer:

an ethylene-vinyl acetate copolymer which is a copolymer with a structure represented by the formula (1) and the formula (2) wherein $R^1$ is H, $R^2$ is H, and $R^3$ is $CH_3$;

an ethylene-methyl acrylate copolymer which is a copolymer with a structure represented by the formula (1) and the formula (3) wherein $R^1$ is H, $R^4$ is H, and $R^5$ is $CH_3$;

an ethylene-ethyl acrylate copolymer which is a copolymer with a structure represented by the formula (1) and the formula (3) wherein $R^1$ is H, $R^4$ is H, and $R^5$ is $C_2H_5$; and an ethylene-methyl methacrylate copolymer which is a copolymer with a structure represented by the formula (1) and the formula (3) wherein $R^1$ is H, $R^4$ is $CH_3$, and $R^5$ is $CH_3$.

Since these copolymers can be designed to have a lower melting point than polyethylene, excellent low-temperature fixability can be obtained. In addition, since rubber elasticity of elastomer can be exhibited, embedding of inorganic fine particles is reduced, which is also preferable from the viewpoint of transfer efficiency. In addition, by including an ester group which is a polar group as compared with polyethylene having a high volume resistance, the volume resistance can be lowered to a considerable extent. Therefore, it is possible to increase the rate of charge rising caused by triboelectric charging, which is also preferable from the viewpoint of scattering property.

Meanwhile, when the olefin copolymer including ester group does not have the structure Y2, it is polyethylene having a high melting point, so that excellent low-temperature fixability cannot be obtained.

The amount of the olefin copolymer including ester group is 50% by mass or more based on the total mass of the resin component. In this case, a highly hydrophobic olefin copolymer including ester group which does not form a salt with the polyvalent metal ion is present as the main binder, and excellent low-temperature fixability and charge retention property can be obtained.

When the amount is less than 50% by mass, the amount of the resin component which does not form a salt with the polyvalent metal ion and maintains a low softening point state is small, so excellent low-temperature fixability cannot be obtained. Furthermore, since high hydrophobicity of the olefin copolymer including ester group is not exhibited and the hydrophilic domains of the salt of the acid group of the olefin copolymer including acid group and the polyvalent metal ion are in excess, excellent charge retention property cannot be obtained.

The amount of the olefin copolymer including ester group is preferably 70% by mass or more. As a result, the low-temperature fixability and charge retention property are improved. The upper limit is not particularly limited but is preferably 90% by mass or less.

Also, the acid value of the olefin copolymer including acid group is from 50 mg KOH/g to 300 mg KOH/g. When the acid value is in the above range, the concentration of the salt with the polyvalent metal ion in the surface layer of the toner particle can be optimally controlled, so excellent low-temperature fixability, charge retention property, transferability, and hot offset resistance can be obtained. The acid value is preferably from 50 mg KOH/g to 150 mg KOH/g.

When the acid value is less than 50 mg KOH/g, the concentration of the salt with the polyvalent metal ion in the surface layer of the toner particle is low, and excellent charge rising performance, transferability and hot offset resistance cannot be obtained. Meanwhile, when the acid value is more than 300 mg KOH/g, the concentration of the salt with the polyvalent metal ion on the toner particle surface layer is high and excellent low-temperature fixability and charge retention property cannot be obtained.

In addition, the toner particle has a surface layer including the olefin copolymer including acid group which has formed a salt with the metal. This is due to the fact that the olefin copolymer including acid group is oriented (arranged) in the toner particle surface.

In the present invention, when the value of [carboxylate index (Ge)]/[carboxylate index (D)], as measured by the FT-IR-ATR method as described hereinbelow, is 1.0 or more, it is determined that the olefin copolymer including acid group is oriented in the toner particle surface and has a surface layer including the olefin copolymer including acid group which has formed a salt with the metal. From the viewpoint of low-temperature fixability, it is preferable that the value of [carboxylate index (Ge)]/[carboxylate index (D)] be 2.0 or less.

In the FT-IR-ATR (Attenuated Total Reflection) method, a sample is brought into close contact with a crystal (ATR crystal) having a higher refractive index than the sample, and infrared light is made incident on the crystal at an incident angle exceeding the critical angle. Then, the incident light undergoes total reflection at the interface between the sample and the crystal which are in close contact with each other. At this time, the infrared light is not reflected at the interface between the sample and the crystal and is totally reflected after bleeding slightly on the sample side. This bleed depth depends on the wavelength, the angle of incidence and the refractive index of the ATR crystal.

$$dp = \lambda/(2\pi n_1) \times [\sin^2\theta - (n_1/n_2)^2]^{-1/2}$$

dp: bleed depth
$n_1$: refractive index of the sample (in the present invention, it is set to 1.5)
$n_2$: refractive index of the ATR crystal (the refractive index is 4.0 when the ATR crystal is Ge, and the refractive index is 2.4 when the ATR crystal is KRS5)
θ: incident angle Therefore, by changing the refractive index and incident angle of the ATR crystal, it is possible to obtain FT-IR spectra with different bleed depths.

Specifically, in the FT-IR spectrum obtained by using the ATR method and measuring under the conditions of Ge as the ATR crystal and the incident angle of infrared light at 45°, the maximum absorption peak intensity in the range of from 1520 cm$^{-1}$ to 1600 cm$^{-1}$ which is considered to be that of the olefin copolymer including acid group which has formed a salt with the metal is taken as a carboxylate (Ge). Further, the maximum absorption peak intensity in the range of from 1725 cm$^{-1}$ to 1765 cm$^{-1}$ considered to be derived from the ester group of the olefin copolymer including ester group is taken as an ester group (Ge). The [carboxylate (Ge)]/[ester group (Ge)] at this time is defined as the carboxylate index (Ge).

The carboxylate index (Ge) relates to the abundance ratio of the olefin copolymer including acid group which has formed a salt with the metal with respect to the resin component at about 0.4 μm from the toner particle surface in the toner particle depth direction which is from the toner particle surface toward the toner particle center.

The carboxylate index (Ge) is preferably from 0.02 to 0.30, more preferably from 0.02 to 0.10, and still more preferably from 0.025 to 0.05. When the carboxylate index (Ge) is from 0.02 to 0.30, it indicates that a hydrophobic and hydrophilic domain-matrix structure is formed in an optimum amount in the toner particle surface layer, and excellent low-temperature fixability, charge retention property, transferability, and hot offset resistance can be obtained.

Further, the carboxylate index (D) is measured in the same manner as the carboxylate index (Ge), except that diamond/KRS 5 is used as the ATR crystal, and the maximum absorption peak intensity in the range of from 1520 cm$^{-1}$ to 1600 cm$^{-1}$ which is considered to be that of the olefin copolymer including acid group which has formed a salt with the metal is taken as the carboxylate (D). Further, the maximum absorption peak intensity in the range of from 1725 cm$^{-1}$ to 1765 cm$^{-1}$ considered to be derived from the ester group of the olefin copolymer including ester group is taken as an ester group (D). The [carboxylate (D)]/[ester group (D)] at this time is defined as the carboxylate index (D).

The carboxylate index (D) relates to the abundance ratio of the olefin copolymer including acid group which has formed a salt with the metal with respect to the resin component at about 1.2 μm from the toner particle surface in the toner particle depth direction which is from the toner particle surface toward the toner particle center. The carboxylate index (Ge) indicates the degree of the amount of the olefin copolymer including acid group which has formed a salt with the metal in the vicinity of the toner particle surface, and the carboxylate index (D) indicates the degree of the amount of the olefin copolymer including acid group which has formed a salt with the metal including the inside of the toner particle.

The [carboxylate index (Ge)]/[carboxylate index (D)] ratio is a value indicating the degree of uneven distribution of the olefin copolymer including acid group which has formed a salt with the metal in the toner particle on the surface thereof. This ratio is preferably from 1.0 to 2.0, and more preferably from 1.1 to 1.4. When this ratio is in the above range, it indicates that a hydrophobic and hydrophilic domain-matrix structure is formed in an optimum amount in the toner particle surface layer, and excellent low-temperature fixability, charge retention property, transferability, and hot offset property can be obtained.

The metal for forming a salt with the acid group of the olefin copolymer including acid group is at least one metal selected from the group consisting of Mg, Ca, Sr, Al, and Zn. Since these metals bind as polyvalent metal ions to a plurality of acid groups to form a salt which forms a crosslinked structure, excellent hot offset resistance can be obtained. Meanwhile, since the monovalent metal ion combines with one acid group to form a salt which does not form a crosslinked structure, excellent hot offset resistance cannot be obtained.

The total amount of at least one metal selected from the group consisting of Mg, Ca, Sr, Al, and Zn in the toner particles is from 25 ppm to 500 ppm on a mass basis. Within the above range, the concentration of the salt with the polyvalent metal ion in the surface layer of the toner particle can be optimally controlled. Therefore, excellent low-temperature fixability, charge retention property, transferability, and hot offset resistance are obtained. The total amount of the metal is preferably from 300 ppm to 450 ppm.

When this amount is less than 25 ppm, the concentration of the salt with the polyvalent metal ion in the toner particle surface layer is low, and excellent transferability and hot offset resistance cannot be obtained. Meanwhile, when the amount is more than 500 ppm, the concentration of the salt with the polyvalent metal ion in the toner particle surface layer is high and excellent low-temperature fixability cannot be obtained.

From the viewpoint of low-temperature fixability, the olefin copolymer including acid group preferably has a carboxy group and more preferably is an ethylene-acrylic acid copolymer or an ethylene-methacrylic acid copolymer. The ethylene-acrylic acid copolymer or the ethylene-methacrylic acid copolymer has a carboxy group as an acid group. The carboxy group is preferred from the standpoint of low-temperature fixability because this group is rich in reactivity, forms a salt with a polyvalent metal ion, and also forms a hydrogen bond with a hydroxyl group on the paper surface and enhances the adhesion between the toner and the paper.

From the viewpoint of low-temperature fixability, it is preferable that the olefin copolymer including ester group have an ester group concentration of from 2.0% by mass to 18.0% by mass, more preferably from 11.0% by mass to 15.0% by mass, based on the total mass of the olefin copolymer including ester group.

The ester group concentration is a value indicating how many (in % by mass) ester group [—C(═O)O—] binding sites are included in the olefin copolymer including ester group, more specifically, a value represented by a formula hereinbelow.

When the ester group concentration is in the above range, the melting point can be designed to be lower than that of polyethylene within a range in which toner storability can be preserved. Therefore, this range is preferable from the viewpoint of low-temperature fixability. Further, since the olefin copolymer including ester group can exhibit rubber elasticity as an elastomer, embedding of inorganic fine particles is reduced, which is also preferable from the viewpoint of transfer efficiency.

Furthermore, since the copolymer can include ester groups which are polar groups, by contrast with polyethylene, in the range in which toner storability can be ensured, volume resistance can be reduced to a considerable extent and the rate of charge rising caused by triboelectric charging can be increased, which is preferable from the viewpoint of scattering property.

$$\text{Ester group concentration (unit: \% by mass)} = [(N \times 44)/(\text{number average molecular weight})] \times 100$$

(where $N$ is the average number of ester groups per one molecule of the olefin copolymer including ester group and 44 is the formula weight of the ester group [—C(═O)O—]).

From the viewpoint of low-temperature fixability, hot offset resistance, and charge retention property, it is preferable that the amount of the olefin copolymer including acid group be from 10.0% by mass to 30.0% by mass, more preferably from 15.0% by mass to 25.0% by mass, based on the total mass of the resin component. Within the above range, the film thickness of the pseudo shell formed by the olefin copolymer including acid group oriented in the toner particle surface layer is optimally controlled and the transferability, hot offset resistance and the charge retention property can be improved without inhibiting the low-temperature fixability of the olefin copolymer including ester group as the main binder.

A method for producing the toner of the present invention is not particularly limited, and a known method can be used, but the method described below is preferable.

A method for producing a toner comprising a toner particle including a resin component, the method including the steps of:

preparing a resin fine particle dispersion liquid;

adding a flocculant to the resin fine particle dispersion liquid to form aggregate particles; and heating and fusing the aggregate particles to obtain a dispersion liquid including toner particles, wherein the resin component contains an olefin copolymer including ester group and an olefin copolymer including acid group, the olefin copolymer including ester group has a structure Y1 represented by formula (1), and at least one structure Y2 selected from the group consisting of a structure represented by formula (2) and a structure represented by formula (3), the olefin copolymer including acid group has an acid value of from 50 mg KOH/g to 300 mg KOH/g, an amount of the olefin copolymer including ester group is 50% by mass or more based on a total mass of the resin component, the toner particle has a surface layer including the olefin copolymer including acid group which has formed a salt with a metal, the metal is at least one metal selected from the group consisting of Mg, Ca, Sr, Al, and Zn, and a total amount of the metal in the toner is from 25 ppm to 500 ppm on a mass basis.

In the above production method, the olefin copolymer including acid group is oriented in the surface of the toner particle, and a large number of crosslinked structures formed by the salt of the acid group of the olefin copolymer including acid group and the polyvalent metal ion is formed in the toner particle surface layer. As a result, charges generated by triboelectric charging are uniformly distributed on the toner surface, the surface hardness of the toner particle can be increased, embedding of the inorganic fine particles can be reduced, and excellent transferability can be obtained. In addition, since it is easy to control the total amount of the metal in the toner, excellent low-temperature fixability, hot offset resistance, and charge retention property can be obtained.

In addition, from the viewpoints of low-temperature fixability and charge retention property, it is preferable that the flocculant in the above production method be a metal salt including at least one metal selected from the group consisting of Mg, Ca, Sr, Al, and Zn. In the case of the metal salts such as indicated above, salt formation between the polyvalent metal ion and the acid group of the olefin copolymer including acid group occurs from the time of aggregation. Therefore, from the viewpoints of low-temperature fixability, charge retention property, transferability, and hot offset resistance, such salts are preferred since it is possible to form finely dispersed hydrophobic and hydrophilic domain-matrix structure in the toner particle surface layer.

In addition, from the viewpoints of low-temperature fixability, hot offset resistance, transferability, and charge retention property, it is preferable that the toner production method include a metal removal step of removing the metal by adding a chelating compound, which has a chelating ability with respect to metal ions, to the dispersion liquid including toner particles. With the metal removal step, the concentration of the salt between the polyvalent metal ion and the acid group of the olefin copolymer including acid group in the toner particle surface layer can be optimally controlled. Therefore, the metal removal step is preferable from the viewpoints of low-temperature fixability, hot offset resistance, transferability, and charge retention property.

Olefin Copolymer Including Ester Group

Where the total mass of the olefin copolymer including ester group is denoted by Z1 and the masses of the structures represented by the formulas (1), (2), and (3) are denoted by 1, m, and n, respectively, from the viewpoint of low-temperature fixability, it is preferable that the value of (1+m+n)/Z1 be from 0.80 to 1.00, more preferably from 0.95 to 1.00, and even more preferably 1.00.

Examples of structures which may be included in the olefin copolymer including ester group other than the structures Y1 and Y2 include a structure represented by a formula (4) and a structure represented by a formula (5). These structures can be introduced by adding a corresponding monomer during the copolymerization reaction producing the olefin copolymer including ester group, or by modifying the olefin copolymer including ester group by a polymer reaction.

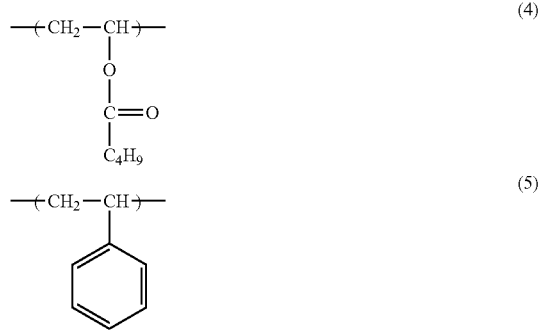

The acid value of the olefin copolymer including ester group in the present invention is preferably from 0 mg KOH/g to 10 mg KOH/g, and more preferably from 0 mg KOH/g to 5 mg KOH/g. From the viewpoint of charge retention property, it is preferable that the acid value be substantially 0 mg KOH/g. When the acid value is within the above range, the moisture adsorption amount of the toner is small, which is preferable from the viewpoint of charge retention property.

From the viewpoints of low-temperature fixability and hot offset resistance, it is preferable that the melt flow rate of the olefin copolymer including ester group be from 5 g/10 min to 30 g/10 min. The melt flow rate is measured under the condition of 190° C. and a 2160-g load according to JIS K 7210. When a plurality of olefin copolymers including ester group is contained in the resin component, measurement is carried out under the above conditions after melt mixing.

When the melt flow rate is within the above range, it indicates excellent melting characteristic, and good low-temperature fixability can be obtained. It also indicates that the viscosity of the toner after melting is maintained within an appropriate range. That is, although the toner on the paper at the fixing nip outlet is melted and deformed and fixed to the paper, viscous stress can be developed. Therefore, the toner can stay on the paper without winding around the fixing film, and hot offset property is improved.

The melt flow rate can be controlled by changing the molecular weight of the olefin copolymer including ester group, and by increasing the molecular weight, the melt flow rate can be lowered. Specifically, from the viewpoint of achieving both low-temperature fixability and hot offset resistance, it is preferable that the molecular weight of the olefin copolymer including ester group be from 50,000 to 500,000, and more preferably 100,000 or more, in terms of weight average molecular weight.

From the viewpoint of low-temperature fixability, it is preferable that the olefin copolymer including ester group have an elongation at break of 300% or more, and more preferably 500% or more. By setting the elongation at break to 300% or more, the bending resistance of the fixed toner is improved. The upper limit of the elongation at break is about 1000% or less.

The elongation at break is measured under the conditions based on JIS K 7162. In the case where a plurality of olefin copolymers including ester group is contained in the resin component, measurement is carried out under the above conditions after melt mixing.

From the viewpoint of low-temperature fixability, it is preferable that the olefin copolymer including ester group have a melting point of from 70° C. to 90° C. The melting point can be controlled by changing the ester group concentration of the olefin copolymer including ester group, and the melting point can be lowered by increasing the ester group concentration.

When the melting point is within the above range, the toner melts during fixing and the viscosity decreases, while storability of the toner is maintained. As a result, low-temperature fixability is improved. Further, since the olefin copolymer including ester group can exhibit rubber elasticity as an elastomer, embedding of inorganic fine particles is reduced, which is also preferable from the viewpoint of transfer efficiency. Furthermore, since the copolymer can include ester groups which are polar groups, by contrast with polyethylene, in the range in which toner storability can be ensured, volume resistance can be reduced to a considerable extent and the rate of charge rising caused by triboelectric charging can be increased, which is preferable from the viewpoint of scattering property.

Olefin Copolymer Including Acid Group

Examples of the olefin copolymer including acid group include resins obtained by random copolymerization, block copolymerization or graft copolymerization of a monomer having an acid group in the structure Y1 represented by the formula (1). These examples are also inclusive of such resins modified by polymer reaction.

Examples of the monomer having an acid group include acrylic acid, methacrylic acid, maleic acid, maleic anhydride, itaconic acid, ethylsulfonic acid, ethenesulfonic acid and the like. As described above, acrylic acid or methacrylic acid is preferable from the viewpoint of low-temperature fixability. In addition, as long as physical properties are not affected, a structure other than the structure Y1 represented by the formula (1) or the acid group may be also included. The amount of the structure other than the structure Y1 represented by the formula (1) or the acid group is preferably 20% by mass or less, more preferably 10% by mass or less, and even more preferably 5% by mass or less, based on the total mass of the olefin copolymer including acid group. From the viewpoint of low-temperature fixability, it is particularly preferable that this amount be substantially 0% by mass. Further, from the viewpoint of low-temperature fixability, the structure Y1 represented by the formula (1) is preferably polyethylene since its melting point can be designed to be low.

From the viewpoint of low-temperature fixability, it is preferable that the olefin copolymer including acid group have a melt flow rate of from 10 g/10 min to 200 g/10 min. The melt flow rate is measured under the condition of 190° C. and 2160 g load according to JIS K 7210. When a plurality of olefin copolymers including acid group is contained in the resin component, measurement is carried out under the above conditions after melt mixing.

When the melt flow rate is within the above range, the olefin copolymer including acid group is compatible with the olefin copolymer including ester group. Therefore, it is possible to include the olefin copolymer including acid group uniformly without any discrepancy between the toner particles. As a result, stable low-temperature fixability can be obtained. The melt flow rate can be controlled by changing the molecular weight of the olefin copolymer including acid group, and the melt flow rate can be lowered by increasing the molecular weight. Specifically, from the viewpoint of low-temperature fixability, it is preferable that the molecular weight of the olefin copolymer including acid group be from 50,000 to 500,000, and more preferably 70,000 or more, in terms of weight average molecular weight.

From the viewpoint of low-temperature fixability, it is preferable that the olefin copolymer including acid group have an elongation at break of 300% or more, and more preferably 500% or more. By setting the elongation at break to 300% or more, the bending resistance of the fixed toner is improved. The upper limit of the elongation at break is about 1000% or less.

The elongation at break is measured under the conditions based on JIS K 7162. In the case where a plurality of olefin copolymers including ester group is contained in the resin component, measurement is carried out under the above conditions after melt mixing.

From the viewpoint of low-temperature fixability and storability, it is preferable that the olefin copolymer including acid group have a melting point of from 50° C. to 100° C. When the melting point is within the above range, the toner melts during fixing and the viscosity decreases, while storability of the toner is maintained. As a result, low-temperature fixability and storability are improved.

Resin Component

In the toner particle of the present invention, other polymers may be added, in addition to the olefin copolymer including ester group and the olefin copolymer including acid group, as the resin components (binder resins) to the extent that the effect of the present invention is not impaired. Specifically, it is possible to use the following polymers or resins.

Homopolymers of styrene and substitution products thereof such as polystyrene, poly-p-chlorostyrene, polyvinyl toluene, and the like; styrene-based copolymers such as styrene-p-chlorostyrene copolymer, styrene-vinyl toluene copolymer, styrene-vinyl naphthalene copolymer, styrene-acrylic acid ester copolymer, styrene-methacrylic acid ester copolymer, and the like; polyvinyl chloride, phenolic resins, natural resin-modified phenolic resins, natural resin-modified maleic resins, acrylic resins, methacrylic resins, polyvinyl acetate, silicone resins, polyester resins, polyurethane resins, polyamide resins, furan resins, epoxy resins, xylene resins, polyethylene resins, polypropylene resins, and the like.

Release Agent

The toner particle may include a silicone oil as a release agent.

As the silicone oil, dimethyl silicone oil, methyl phenyl silicone oil, methyl hydrogen silicone oil, amino modified silicone oil, carboxyl-modified silicone oil, alkyl-modified silicone oil, fluorine-modified silicone oil, and the like can be used. Of these, dimethyl silicone oil is preferable from the viewpoint of hot offset resistance.

When the silicone oil is dimethyl silicone oil, since the difference in polarity between the olefin copolymer including ester group and the olefin copolymer including acid group increases, the silicone oil is likely to seep during fixing. Therefore, from the viewpoint of hot offset resistance, the silicone oil is preferable because an interface of the silicone oil is formed between a fixing member such as a fixing film and the toner layer on the image to improve releasability.

The amount of the silicone oil is preferably from 15 parts by mass to 30 parts by mass with respect to 100 parts by mass of the resin component. The above range is preferable from the viewpoint of hot offset resistance because the silicone oil seeps sufficiently during fixing.

The kinematic viscosity of the silicone oil at 25° C. is preferably from 300 mm$^2$/s to 1000 mm$^2$/s. The above range is preferable from the viewpoint of hot offset resistance because the silicone oil seeps sufficiently during fixing.

Plasticizer

The toner particles may include an aliphatic hydrocarbon compound as a plasticizer.

The melting point of the aliphatic hydrocarbon compound is preferably from 50° C. to 100° C. From the viewpoint of low-temperature fixability, it is preferable that the aliphatic hydrocarbon compound be contained in an amount of from 1 part by mass to 40 parts by mass with respect to 100 parts by mass of the resin component.

When heated, the aliphatic hydrocarbon compound can plasticize the olefin copolymer including ester group. At the time of heat fixing of the toner, the olefin copolymer including ester group forming the matrix is plasticized and the low-temperature fixability is improved.

Further, the aliphatic hydrocarbon compound having a melting point from 50° C. to 100° C. also acts as a nucleating agent for the olefin copolymer including ester group. For this reason, the micro-mobility of the olefin copolymer including ester group is suppressed and the charge retention property is improved. From the viewpoint of low-temperature fixability and charge retention property, it is preferable that the amount of the aliphatic hydrocarbon compound be from 10 parts by mass to 30 parts by mass with respect to 100 parts by mass of the resin component.

Specific examples of the aliphatic hydrocarbon compound include aliphatic hydrocarbons having from 20 to 60 carbon atoms such as hexacosane, triacosane, and hexatriacosane.

Colorant

The toner particle may include a colorant. Examples of the colorant are presented hereinbelow.

A black colorant can be exemplified by carbon black and colorants which are colored black using a yellow colorant, a magenta colorant and a cyan colorant. A pigment alone may be used as the colorant, but from the viewpoint of image quality of a full-color image, it is more preferable to use a dye and a pigment in combination so as to improve the image sharpness.

A pigment for a magenta toner can be exemplified by C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C. I. Pigment Violet 19; and C. I. Vat Red 1, 2, 10, 13, 15, 23, 29, and 35.

A dye for a magenta toner can be exemplified by oil-soluble dyes such as C. I. Solvent Red 1, 3, 8, 23, 24, 25, 27, 30, 49, 81, 82, 83, 84, 100, 109, and 121; C. I. Disperse Red 9; C. I. Solvent Violet 8, 13, 14, 21, and 27; and C. I. Disperse Violet 1; and basic dyes such as C. I. Basic Red 1, 2, 9, 12, 13, 14, 15, 17, 18, 22, 23, 24, 27, 29, 32, 34, 35, 36, 37, 38, 39, and 40; and C. I. Basic Violet 1, 3, 7, 10, 14, 15, 21, 25, 26, 27 and 28.

A pigment for a cyan toner can be exemplified by C. I. Pigment Blue 2, 3, 15:2, 15:3, 15:4, 16, and 17; C. I. Vat Blue 6; C. I. Acid Blue 45, and copper phthalocyanine pigments in which 1 to 5 phthalimidomethyl groups are substituted in the phthalocyanine skeleton.

A dye for a cyan toner can be exemplified by C. I. Solvent Blue 70.

A pigment for a yellow toner can be exemplified by C. I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185; and C. I. Vat Yellow 1, 3, and 20.

A dye for a yellow toner can be exemplified by C. I. Solvent Yellow 162.

These colorants can be used singly or in a mixture, or in a solid solution state. The colorant is selected from the viewpoints of hue angle, chroma, lightness, lightfastness, OHP transparency, and dispersibility in the toner.

The amount of the colorant is preferably from 0.1 part by mass to 30.0 parts by mass with respect to 100 parts by mass of the resin component.

Inorganic Fine Particles

The toner may include inorganic fine particles as necessary.

The inorganic fine particles may be internally added to the toner particles or may be mixed with the toner particles as an external additive.

As the external additive, inorganic fine particles such as silica, titanium oxide, aluminum oxide are preferable. The inorganic fine particles are preferably hydrophobized with a hydrophobizing agent such as a silane compound, silicone oil or a mixture thereof.

As an external additive for improving flowability, inorganic fine particles having a specific surface area of from 50 $m^2/g$ to 400 $m^2/g$ are preferable, and for improving durability and stability, inorganic particles having a specific surface area of from 10 $m^2/g$ to 50 $m^2/g$ are preferable. In order to improve flowability and also durability and stability, inorganic fine particles having a specific surface area within the above ranges may be used in combination.

The amount of the external additive is preferably from 0.1 part by mass to 10.0 parts by mass with respect to 100 parts by mass of the toner particles. For mixing the toner particles and the external additives, a known mixer such as a Henschel mixer can be used.

Developer

The toner of the present invention can also be used as a one-component type developer, but in order to further improve dot reproducibility and to supply a stable image for a long period of time, the toner can be mixed with a magnetic carrier to form a two-component developer.

Examples of the magnetic carrier include generally well-known magnetic carriers such as iron oxide; metal particles such as iron, lithium, calcium, magnesium, nickel, copper, zinc, cobalt, manganese, chromium, and rare earths, alloy particles thereof, oxide particles thereof; magnetic body such as ferrites and the like; and magnetic body-dispersed resin carriers (so-called resin carriers) including a magnetic body and a binder resin that keeps the magnetic body in a dispersed state.

When the toner is mixed with a magnetic carrier and used as a two-component developer, the mixing ratio of the magnetic carrier at that time is preferably from 2% by mass to 15% by mass, more preferably 4% by mass to 13% by mass, as the toner concentration in the two-component developer.

Method for Producing Toner

A method for producing the toner particles of the present invention is not particularly limited and any method can be used, but it is preferable that the toner particles be produced in an aqueous medium.

Where the toner particles are produced in an aqueous medium, the olefin copolymer including acid group tends to be oriented on the surface of the toner particle, and the structure crosslinked by the salt of the olefin copolymer including acid group acid group and the polyvalent metal ion is formed in a large amount in the toner particle surface layer. As a result, charges generated by triboelectric charging are uniformly distributed on the toner particles surface, so that excellent transferability can be obtained.

In addition, the acid group on the toner particle surface forms a hydrogen bond with the hydroxyl group on the paper surface, and the adhesion between the toner and the paper is improved, so that the low-temperature fixability is improved.

From the viewpoints of low-temperature fixability, transferability, hot offset resistance, and charge retention property, it is more preferable that the toner be an emulsion aggregation toner produced by an emulsion aggregation method described hereinbelow. The reason is that, as described above, salt formation occurs between the polyvalent metal ion and the acid group of the olefin copolymer including acid group from the time of aggregation of the toner particles, which makes it possible to form a finely dispersed hydrophobic and hydrophilic domain-matrix structure in the toner particle surface layer. Further, particle diameter control is facilitated and toner particles having a sharp particle diameter distribution can be easily produced.

Emulsion Aggregation Method

In the emulsion aggregation method, an aqueous dispersion liquid of fine particles composed of a constituent material of toner particles, which is sufficiently small in diameter with respect to the target particle, is prepared in advance, the fine particles are aggregated in the aqueous medium until the particle diameter of the toner particles is reached, and the aggregate particles are fusion-bonded by heating to produce toner particles.

That is, the emulsion aggregation method includes a step of preparing a fine particle dispersion liquid composed of a constituent material of toner particles such as a resin fine particle dispersion liquid, an aggregating step of mixing fine particles made of the constituent material of toner particles and adding a flocculant to aggregate the particles and form aggregate particles, and a fusing step of heating the obtained aggregate particles and fusing the resin component contained in the aggregate particles.

Further, in addition to the above-described steps, it is also possible to use a cooling step, a metal removal step of filtering the obtained toner particles to remove excessive polyvalent metal ions, a filtration/washing step of washing with ion exchanged water and the like, and a step of removing moisture present in the washed toner and drying.

In the emulsion aggregation method, a step of treating the wet cake of the toner obtained in the filtration/washing step with an organic solvent or a step of treating the toner finally obtained through the drying step with an organic solvent may be performed as a step of contacting with an organic solvent and a separation step.

Step of Preparing Resin Fine Particle Dispersion Liquid (Preparation Step)

A resin fine particle dispersion liquid can be prepared by known methods but is not limited to these methods. Examples of suitable methods include an emulsion polymerization method, a self-emulsification method, a phase inversion emulsification method in which a resin is emulsified by adding an aqueous medium to a resin solution obtained by dissolving in an organic solvent, or a forced emulsification method in which the resin is forcibly emulsified by high-temperature treatment in an aqueous medium, without using an organic solvent.

Specifically, the resin components (the olefin copolymer including ester group, the olefin copolymer including acid group, and optionally other resins) are dissolved in an organic solvent in which these resins can be dissolved, and a surfactant and a basic compound are added. In this case, where the resin components are crystalline resins having a melting point, they may be heated and melted at a temperature higher than the melting point. Subsequently, an aqueous medium is added slowly to precipitate fine resin particles while stirring with a homogenizer or the like. Thereafter, the solvent is removed by heating or depressurization to prepare an aqueous dispersion liquid of fine resin particles.

Here, as the organic solvent used for dissolving the olefin copolymer including ester group and the olefin copolymer including acid group, any organic solvent that can dissolve the two resins can be used, and from the viewpoint of suppressing the generation of coarse powder it is preferable to use an organic solvent forming a homogeneous phase with water, such as toluene.

The surfactant to be used in the preparation step is not particularly limited, and examples thereof include anionic surfactants such as those based on sulfuric acid esters and salts, sulfonic acid salts, carboxylic acid salts, phosphoric acid esters, soaps and the like; cationic surfactants such as amine salts and quaternary ammonium salts; and nonionic surfactants such as those based on polyethylene glycol, alkylphenol ethylene oxide adducts, polyhydric alcohols and the like. The surfactants may be used singly or in combination of two or more thereof.

Examples of the basic compound to be used in the preparation step include inorganic bases such as sodium hydroxide and potassium hydroxide, and organic bases such as ammonia, triethylamine, trimethylamine, dimethylaminoethanol, and diethylaminoethanol. The basic compounds may be used singly or in combination of two or more thereof.

As for the dispersed particle diameter of the resin fine particles in the aqueous dispersion liquid, from the viewpoint of making it is easy to obtain toner particles having an appropriate volume average particle diameter of from 3 µm to 10 µm as toner particles, it is preferable that the 50% diameter (D50), based on volume distribution, be 0.05 µm to 1.0 µm, and more preferably 0.05 µm to 0.4 µm. A dynamic light scattering type particle diameter distribution meter Nanotrac UPA-EX150 (manufactured by Nikkiso Co., Ltd.) can be used for measuring the 50% particle diameter (D50), based on volume distribution.

Colorant Fine Particle Dispersion Liquid

The colorant fine particle dispersion liquid which is used as necessary can be prepared by the following known methods but is not limited to these methods.

Thus, the colorant fine particle dispersion liquid can be prepared by mixing a colorant, an aqueous medium and a dispersing agent with a well-known mixer such as a stirrer, an emulsifier, and a disperser. Known materials such as a surfactant and a polymeric dispersing agent can be used as the dispersing agent.

The dispersing agent such as a surfactant and a polymeric dispersing agent can be removed in a washing step to be described hereinbelow, but from the viewpoint of washing efficiency, a surfactant is preferable.

Examples of the surfactant include anionic surfactants such as those based on sulfuric acid esters and salts, sulfonic acid salts, phosphoric acid esters, soaps and the like; cationic surfactants such as amine salts and quaternary ammonium salts; and nonionic surfactants such as those based on polyethylene glycol, alkylphenol ethylene oxide adducts, polyhydric alcohols and the like.

Among them, a nonionic surfactant or an anionic surfactant is preferable. Further, a nonionic surfactant and an anionic surfactant may be used in combination. The surfactants may be used singly or in combination of two or more thereof. The concentration of the surfactant in the aqueous medium may be 0.5% by mass to 5% by mass.

The amount of the colorant fine particles in the colorant fine particle dispersion liquid is not particularly limited, but it is preferably 1% by mass to 30% by mass.

Further, as for the dispersed particle diameter of the colorant fine particles in the aqueous dispersion liquid, from the viewpoint of dispersibility of the colorant in the finally obtained toner, it is preferable that the 50% particle diameter (D50), based on volume distribution, be 0.5 µm or less. For the same reason, it is preferable that the 90% particle diameter (D90), based on volume distribution, be 2 µm or less. The dispersed particle diameter of the colorant fine particles dispersed in the aqueous medium can be measured with a dynamic light scattering type particle diameter distribution meter (Nanotrac UPA-EX 150: manufactured by Nikkiso Co., Ltd.).

A known mixer such as a stirrer, an emulsifier, and a disperser to be used for dispersing a colorant in an aqueous medium can be exemplified by an ultrasonic homogenizer, a jet mill, a pressure type homogenizer, a colloid mill, a ball mill, a sand mill, and a paint shaker. These may be used singly or in combination.

Plasticizer (Aliphatic Hydrocarbon Compound) Fine Particle Dispersion Liquid

A plasticizer fine particle dispersion liquid may be used if necessary. The plasticizer fine particle dispersion liquid can be prepared by the following known methods, but it is not limited to these methods.

A plasticizer fine particle dispersion liquid can be prepared by adding a plasticizer to an aqueous medium including a surfactant, heating to a temperature equal to or higher than the melting point of the plasticizer, dispersing to a particulate shape with a homogenizer having a strong shearing ability (for example, "Clearmix W Motion", manufactured by M Technique Co., Ltd.) or a pressure discharge type dispersing machine (for example, "Gaulin Homogenizer" manufactured by Gaulin Co.), and then cooling to below the melting point.

As for the dispersed particle diameter of the plasticizer fine particles in the aqueous dispersion liquid, the 50% particle diameter (D50), based on volume distribution, is preferably 0.03 µm to 1.0 µm, and more preferably 0.1 µm to 0.5 µm. Also, it is preferable that coarse particles of 1 µm or more be not present.

When the dispersed particle diameter of the plasticizer fine particles is within the above range, the plasticizer can be finely dispersed in the toner, thereby maximizing the plasticizing effect at the time of fixing and achieving good low-temperature fixing. The dispersed particle diameter of the plasticizer fine particles dispersed in the aqueous medium can be measured with a dynamic light scattering type particle diameter distribution meter (Nanotrac UPA-EX 150: manufactured by Nikkiso Co., Ltd.).

Silicone Oil Fine Particle Dispersion Liquid

If necessary, a silicone oil fine particle dispersion liquid may be used. The silicone oil fine particle dispersion liquid may be prepared as a composite fine particle dispersion liquid obtained by mixing a resin component and a silicone oil. This is preferable from the viewpoint of transfer efficiency because the amount of silicone oil on the surface of toner particles can be easily adjusted to an appropriate range while increasing the amount of silicone oil in the toner particles.

Specifically, in the step of preparing the resin fine particle dispersion liquid, the silicone oil may be mixed with a solution in which the resin is dissolved in an organic solvent.

Further, the silicone oil fine particle dispersion liquid can be separately prepared by the following known methods, but it is not limited to these methods.

Thus, the silicone oil fine particle dispersion liquid can be prepared by mixing a silicone oil, an aqueous medium and a dispersing agent with a known mixer such as a stirrer, an emulsifier, and a disperser. Known materials such as surfactant and a polymeric dispersing agent can be used as the dispersing agent.

The dispersing agent such as a surfactant and a polymeric dispersing agent can be removed in a washing step to be described hereinbelow, but from the viewpoint of washing efficiency, a surfactant is preferable.

Examples of the surfactant include anionic surfactants such as those based on sulfuric acid esters and salts, sulfonic acid salts, phosphoric acid esters, soaps and the like; cationic surfactants such as amine salts and quaternary ammonium salts; and nonionic surfactants such as those based on polyethylene glycol, alkylphenol ethylene oxide adducts, polyhydric alcohols and the like.

Among them, a nonionic surfactant or an anionic surfactant is preferable. Further, a nonionic surfactant and an anionic surfactant may be used in combination. The surfactants may be used singly or in combination of two or more thereof. The concentration of the surfactant in the aqueous medium is preferably 0.5% by mass to 5% by mass.

The amount of the silicone oil fine particles in the silicone oil fine particle dispersion liquid is not particularly limited, but it is preferably 1% by mass to 30% by mass.

Further, as for the dispersed particle diameter of the silicon oil in the aqueous dispersion liquid, from the viewpoint of facilitating the control of silicone oil amount on the toner particle surface, it is preferable that the 50% particle diameter (D50), based on volume distribution, be 0.5 µm or less. For the same reason, it is preferable that the 90% particle diameter (D90), based on volume distribution, be 2.0 µm or less. The dispersed particle diameter of the silicone compound dispersed in the aqueous medium can be measured with a dynamic light scattering type particle diameter distribution meter (Nanotrac: manufactured by Nikkiso Co., Ltd.).

A known mixer such as a stirrer, an emulsifier, and a disperser to be used for dispersing a silicone oil in an aqueous medium can be exemplified by an ultrasonic homogenizer, a jet mill, a pressure type homogenizer, a colloid mill, a ball mill, a sand mill, and a paint shaker. These may be used singly or in combination.

Aggregation Step

A resin file particle dispersion liquid and, if necessary, a mixture thereof with a plasticizer fine particle dispersion liquid, a silicone compound fine particle dispersion liquid, and a colorant fine particle dispersion liquid is prepared. A well-known mixing device such as a homogenizer and a mixer can be used in this process.

Then, the fine particles contained in the obtained liquid mixture are aggregated to form aggregate particles of a target particle diameter. At this time, by adding and mixing a flocculant and appropriately applying heating and/or mechanical power as necessary, aggregate particles are formed in which the resin fine particles and optionally added plasticizer fine particles, silicone compound fine particles and colorant fine particles are aggregated.

As the flocculant, it is preferable to use a flocculant including a metal ion with a valence of 2 or more. A flocculant including at least one metal ion selected from the group consisting of Mg, Ca, Sr, Al, and Zn is more preferable.

A flocculant including a metal ion with a valence of 2 or more has high aggregation power and can be added in a small amount to achieve the object. Such a flocculant can ionically neutralize the ionic surfactant contained in the resin fine particle dispersion liquid or the like. As a result, the resin fine particles, the plasticizer fine particles, the silicone compound fine particles and the colorant fine particles are aggregated by salting out and ionic crosslinking effect.

The flocculant including a metal ion with a valence of 2 or more can be exemplified by a metal salt or a polymer of a metal salt having a valence of 2 or more (preferably divalent or trivalent).

Specific examples thereof include divalent inorganic metal salts such as calcium chloride, calcium nitrate, magnesium chloride, magnesium sulfate, and zinc chloride. Other examples include trivalent metal salts such as iron (III) chloride, iron (III) sulfate, aluminum sulfate, and aluminum chloride. In addition, inorganic metal salt polymers such as poly(aluminum chloride), poly(aluminum hydroxide), and poly(calcium sulfide) can be mentioned, but the present invention is not limited thereto. These may be used singly or in combination of two or more thereof.

The flocculant may be added in any form, such as a dry powder and an aqueous solution obtained by dissolution in an aqueous medium, but it is preferable to add the flocculant in the form of an aqueous solution in order to cause uniform aggregation.

Addition and mixing of the flocculant are preferably carried out at a temperature equal to or lower than the glass transition temperature or melting point of the resin component contained in the liquid mixture. As a result of performing mixing under this temperature condition, aggregation proceeds relatively uniformly. Mixing of the flocculant to the liquid mixture can be carried out using a known mixing device such as a homogenizer and a mixer. The aggregation step is a step of forming aggregate particles of a toner particle diameter in an aqueous medium. The volume average particle diameter (D4) of the aggregate particles produced in the aggregation step is preferably from 3 µm to 10 µm.

The volume average particle diameter of the aggregate particles can be measured using a particle diameter distribution analyzer (Coulter Multisizer III: manufactured by Beckman Coulter, Inc.) based on the Coulter method.

Fusion Step

In the fusing step, the aggregation stopper is added, under the same stirring as in the aggregation step, to the dispersion liquid including the aggregate particles obtained in the aggregation step. The aggregation stopper, can be exemplified by a basic compound which shifts equilibrium of the acidic polar group of the surfactant to the dissociation side and stabilizes the aggregate particles. Another example is a chelating agent that stabilizes the aggregate particles by partially dissociating ionic crosslinking between the acidic polar group of the surfactant and the metal ion as a flocculant to form a coordinate bond with the metal ion. Among them, a chelating agent having a larger effect of stopping aggregation is preferable.

After the dispersion state of the aggregate particles in the dispersion liquid has been stabilized by the action of the aggregation stopper, the aggregate particles are fused by heating to a temperature equal to or higher than the glass transition temperature or melting point of the resin component.

The chelating agent is not particularly limited as long as it is a known water-soluble chelating agent. Specific examples include hydroxycarboxylic acids such as tartaric acid, citric acid, and gluconic acid, as well as sodium salts thereof iminodiacid (IDA), nitrilotriacetic acid (NTA), and ethylenediaminetetraacetic acid (EDTA) as well as sodium salts thereof.

The chelating agent coordinates the metal ion of the flocculant present in the dispersion liquid of the aggregate particles so that the environment in the dispersion liquid can be changed from an electrostatically unstable state in which aggregation easily proceeds to an electrostatically stable state in which further aggregation is unlikely to occur. As a result, further aggregation of the aggregate particles in the dispersion liquid can be suppressed, the aggregate particles can be stabilized, and toner particles can be obtained.

The chelating agent is preferably an organic metal salt having a carboxylic acid with a valence of 3 or more, since such a chelating agent is effective even when added in small amounts and toner particles with sharp particle diameter distribution can be obtained.

From the viewpoint of achieving both stabilization from the aggregated state and washing efficiency, it is preferable that the addition amount of the chelating agent be 1 part by mass to 30 parts by mass and more preferably 2.5 parts by mass to 15 parts by mass, based on 100 parts by mass of the resin component.

After the addition of the aggregation stopper, the aggregate particles are preferably heated to a temperature equal to or higher than the melting point of the resin component (the olefin copolymer including ester group and the olefin copolymer including acid group, and if necessary, other resins) and fused, thereby producing particles having smoothed aggregate particle surface. The heating temperature is preferably equal to or higher than the melting point of the resin component contained in the aggregate particle and less than the temperature at which the resin component thermally decomposes.

The heating and fusion time is short if the heating temperature is high, and a long time is needed if the heating temperature is low. That is, since the time of heating and fusion depends on the temperature of heating, it cannot be specified unconditionally, but it is generally about 10 min to 10 h.

The volume average particle diameter (D4) of the toner particles is preferably from 3 µm to 10

Cooling Step

In the cooling step, the dispersion liquid including the toner particles obtained in the fusion step is cooled to a temperature lower than the crystallization temperature and/or the glass transition temperature of the resin component. Cooling to such a low temperature makes it possible to suppress the generation of coarse particles. A specific cooling rate is 0.1° C./min to 50° C./min.

It is also preferable to perform annealing to promote crystallization by maintaining the temperature at which the crystallization rate of the olefin copolymer including ester group is high during cooling or after cooling. For example, crystallization is promoted by maintaining the temperature at 30° C. to 70° C., preferably at about 50° C.

Metal Removing Step

As described above, in the present invention, it is preferable to include a step of removing a metal by adding a chelating compound, which has a chelating ability with respect to excessive metal ions, to a dispersion liquid including the toner particles. The chelating compound is not particularly limited as long as it is a known water-soluble chelating agent, and the above-described chelating agent can be used. From the viewpoint of metal removal performance, this step is preferably performed at a temperature from 40° C. to 60° C., and more preferably from 45° C. to 55° C.

Washing Step

Impurities in the toner particles can be removed by repeatedly washing and filtering (washing step) the toner particles obtained in the cooling step. Specifically, it is preferable to wash the toner particles with an aqueous solution including a chelating agent such as ethylenediaminetetraacetic acid (EDTA) and Na salt thereof, and then wash with pure water. Washing with pure water can remove metal salts and surfactants in the toner particles by repeating filtration a plurality of times. From the viewpoint of production efficiency, the number of times of filtration is preferably 3 to 20, and more preferably 3 to 10.

Step of Contacting with Organic Solvent and Separation Step

In the step of bringing into contact with the organic solvent and the separation step, if necessary, the toner particles obtained in the washing step can be brought into contact with an organic solvent and separated. As a result, a low molecular weight silicone compound having high affinity for the organic solvent is washed, and a thin film of a silicone compound having a sharp molecular weight distribution can be formed on the toner particle surface.

Unlike solvents for washing release agents conventionally used, the organic solvent to be used preferably has the affinity for the silicone compound which is lower by a certain value or more. Since the affinity is somewhat low, the silicone compound is not excessively drawn out from the toner particles, and the fixing separability does not deteriorate. Examples of the organic solvent include ethanol, methanol, propanol, isopropanol, ethyl acetate, methyl acetate, butyl acetate, and mixtures thereof.

The organic solvent may include water, and the amount of water is preferably from 0 parts by mass to 10 parts by mass with respect to 100 parts by mass of the organic solvent. When the amount of water in the organic solvent is within the above range, a low-molecular-weight silicone compound in the vicinity of the toner particle surface can be removed.

The processing time of the contacting step between the toner particles and the organic solvent is preferably from 1 min to 60 min.

In the step of bringing the toner particles into contact with the organic solvent, when mixing the toner particles and the organic solvent to obtain an organic solvent dispersion liquid of the toner particles, stirring may be carried out with a stirring blade or with a homogenizer, an ultrasonic disperser or the like. From the viewpoint of uniformly processing the toner particles, it is preferable that stirring be performed with a homogenizer, an ultrasonic disperser or the like.

The step of separating the toner particles and the organic solvent is a step of physically separating the organic solvent dispersion liquid of the toner particles obtained in the contacting step or a mixture of the toner wet cake and the organic solvent by filtration or the like. The separation method is not particularly limited as long as it is possible to separate the toner particles and the organic solvent, and examples of suitable separation methods include suction filtration, pressure filtration, or centrifugation.

In the step of contacting and the step of separating the toner particles and the organic solvent, the steps of contacting and separating may be repeated a plurality of times. Particularly, in the case of treating a mixture of the toner wet cake and the organic solvent, since the removability of the silicone compound sometimes deteriorates due to the influence of water present in the toner wet cake, it is preferable to treat the mixture a plurality of times.

Drying Step

In the drying step, the toner particles obtained in the above step are dried.

External Addition Step

In the external addition step, inorganic fine particles are externally added, if necessary, to the toner particles obtained in the drying step. Specifically, it is preferable to add inorganic fine particles such as silica, alumina, titania, calcium carbonate and the like, or resin fine particles such as particles of a vinyl resin, a polyester resin, a silicone resin, and the like while applying a shearing force in a dry state.

Methods for measuring various physical properties of the toner and raw materials will be described below.

Method for Measuring Total Amount of Metals in Toner

The total amount of metals in the toner is measured with a multi-element simultaneous ICP emission spectrophotometer Vista-PRO (manufactured by Hitachi High-Tech Science Co., Ltd.).
Sample: 50 mg
Solvent: 6 ml of nitric acid The abovementioned components are weighed and a decomposition treatment is performed using a microwave sample pretreatment device ETHOS UP (manufactured by Milestone General Co.).
Temperature: increase from 20° C. to 230° C., holding at 230° C. for 30 min The decomposition solution is filtered through filter paper (5C), transferred to a 50 ml volumetric flask, and made up to 50 ml with ultrapure water. By measuring the aqueous solution in the measuring flask with the multi-element simultaneous ICP emission spectrophotometer Vista-PRO under the following conditions, the total amount of metal elements (Mg, Ca, Sr, Al, and Zn) in the toner can be quantitatively determined. For the quantitative determination of the amount, a calibration curve is prepared using a standard sample of the element to be quantified, and calculation is performed on the basis of the calibration curve.
Conditions: RF power 1.20 kW
Ar gas: plasma flow 15.0 L/min, auxiliary flow 1.50 L/min, MFC 1.50 L/min, nebula flow 0.90 L/min, feeding pump speed 15 rpm, measurement repeated 3 times, measurement time 1.0 s Method for Measuring Carboxylate Index (Ge) and Carboxylate Index (D)

The FT-IR spectrum is measured by the ATR method using a Fourier transform infrared spectrophotometer (Spectrum One: manufactured by PerkinElmer Inc.) equipped with a universal ATR measurement accessory (Universal ATR Sampling Accessory). A specific measurement procedure is described hereinbelow.

The angle of incidence of infrared light is set to 45°. The ATR crystal of Ge (refractive index=4.0) and the ATR crystal of diamond/KRS5 (refractive index=2.4) are used as the ATR crystal. Other conditions are as follows.
Range
Start: 4000 cm$^{-1}$
End: 600 cm$^{-1}$ (ATR crystal of Ge), 400 cm$^{-1}$ (ATR crystal of KRS5)
Duration
Scan number: 16
Resolution: 4.00 cm$^{-1}$
Advanced: With $CO_2/H_2O$ correction Measurement and Calculation Method of Carboxylate Index (Ge)

(1) The ATR crystal of Ge (refractive index=4.0) is mounted on the device.
(2) Scan type is set to Background, Units are set to EGY and the background is measured.
(3) Scan type is set to Sample and Units are set to A.
(4) The toner, 0.01 g, is accurately weighed on the ATR crystal.
(5) The sample is pressurized with a pressure arm (Force Gauge 90).
(6) The sample is measured.
(7) Baseline correction is performed on the obtained FT-IR spectrum with Automatic Correction.
(8) The maximum value of the absorption peak intensity in the range from 1520 cm$^{-1}$ to 1600 cm$^{-1}$ is calculated and taken as carboxylate (Ge).
(9) The maximum value of the absorption peak intensity in the range from 1725 cm$^{-1}$ to 1765 cm$^{-1}$ is calculated and taken as ester group (Ge).
(10) Carboxylate (Ge)/ester group (Ge) is taken as the carboxylate index (Ge).

Measurement and Calculation Method of Carboxylate Index (D)

(1) The ATR crystal of diamond/KRS5 (refractive index=2.4) is mounted on the device.

(2) Scan type is set to Background, Units are set to EGY and the background is measured.

(3) Scan type is set to Sample and Units are set to A.

(4) The toner, 0.01 g, is accurately weighed on the ATR crystal.

(5) The sample is pressurized with a pressure arm (Force Gauge 90).

(6) The sample is measured.

(7) Baseline correction is performed on the obtained FT-IR spectrum with Automatic Correction.

(8) The maximum value of the absorption peak intensity in the range from 1520 $cm^{-1}$ to 1600 $cm^{-1}$ is calculated and taken as carboxylate (D).

(9) The maximum value of the absorption peak intensity in the range from 1725 $cm^{-1}$ to 1765 $cm^{-1}$ is calculated and taken as ester group (D).

(10) Carboxylate (D)/ester group (D) is taken as the carboxylate index (D).

Method for Measuring Concentration of Ester Groups of Olefin Copolymer Including Ester Group The concentration of ester groups of the olefin copolymer including ester group is determined by $^1$H NMR. The respective structural ratios can be calculated by comparing respective integral ratios of hydrogen of alkylene represented by the structure (1), hydrogen of acetyl group or propionyl group represented by the structure (2), and hydrogen of methyl group or ethyl group bonded to the oxygen represented by the structure (3). The concentration of ester groups can be calculated by introducing the obtained structural ratio into the following formula.

Concentration of ester groups (unit: % by mass)=
[($N$×44)/(number average molecular weight)]×100

Here, N is the average of the number of ester groups per molecule of the olefin copolymer including ester group, and 44 is the formula weight of the ester group [—C(=O)O—].
Apparatus: JNM-ECZR series FT NMR (manufactured by JEOL Ltd.)
Solvent: heavy acetone 5 ml (tetramethylsilane is included as internal standard with a 0.00 ppm chemical shift)
Sample: 5 mg
Repeat time: 2.7 sec
Number of integrations: 16

For example, in the case of the olefin copolymer including ester group 1 (ethylene-vinyl acetate copolymer) used in Example 1, the peak at 1.14-1.36 ppm corresponds to $CH_2$—$CH_2$ having a structure derived from ethylene, and the peak near 2.04 ppm corresponds to $CH_3$ having a structure derived from vinyl acetate. The ratio of the integrated values of those peaks is calculated, and the content ratio of each structure is calculated.

When Measuring from Toner

Measurement is performed after separating the olefin copolymer including ester group and/or the olefin copolymer including acid group from the toner by using the difference in solubility in the solvent.

Separation of the olefin copolymer including ester group and/or the olefin copolymer including acid group from the toner is carried out according to the following procedure.

First separation: the toner is dissolved in MEK at 23° C., and a soluble fraction (for example, an amorphous resin and the like) and an insoluble fraction (olefin copolymer including ester group, olefin copolymer including acid group, release agent colorant, inorganic particles) are separated.

Second separation: the insoluble matter (olefin copolymer including ester group, olefin copolymer including acid group, release agent, colorant, inorganic particles) obtained in the first separation is dissolved in toluene at 50° C., and a soluble fraction (olefin copolymer including ester group and olefin copolymer including acid group) and an insoluble fraction (release agent, colorant, inorganic particles) are separated.

Third separation: the soluble fraction (olefin copolymer including ester group and olefin copolymer including acid group) obtained in the second separation is dissolved in THF at 40° C., and a soluble fraction (olefin copolymer including ester group) and an insoluble fraction (olefin copolymer including acid group) are separated.

The concentration of ester groups of the olefin copolymer including ester group can be measured by $H^1$ NMR measurement of the obtained soluble fraction (olefin copolymer including ester group).

The amount of the olefin copolymer including ester group and the olefin copolymer including acid group, the acid value thereof, and the like can also be measured using the separated sample.

Method for Measuring Acid Value of Olefin Copolymer including Ester Group and Olefin Copolymer including Acid Group The acid value is the number of mg of potassium hydroxide required for neutralizing acid components such as a free fatty acid and a resin acid contained in 1 g of the sample. The measurement is performed according to JIS-K0070-1992 as follows.

(1) Reagent

A total of 1.0 g of phenolphthalein is dissolved in 90 mL of ethyl alcohol (95% by volume), and ion exchanged water is added to make it 100 mL and obtain a phenolphthalein solution.

A total of 7 g of special grade potassium hydroxide is dissolved in 5 mL of water and ethyl alcohol (95% by volume) is added to make 1 L. The solution is placed in an alkali-resistant container and allowed to stand for 3 days so as to prevent contact with carbon dioxide gas, and then filtering is performed to obtain a potassium hydroxide solution. The obtained potassium hydroxide solution is stored in an alkali-resistant container. A total of 25 mL of 0.1 mL/L hydrochloric acid is taken into an Erlenmeyer flask, several drops of phenolphthalein solution are added, titration is performed with the potassium hydroxide solution, and the factor of the potassium hydroxide solution obtained hereinabove is determined from the amount of potassium hydroxide solution required for neutralization. The 0.1 mol/L hydrochloric acid is prepared according to JIS K 8001-1998.

(2) Operation (A) Main Test

A total of 2.0 g of a crushed sample is accurately weighed in a 200 mL Erlenmeyer flask, 100 mL of a mixed solution of toluene/ethanol (2:1) is added, and dissolution is performed over 5 h. Then, several drops of phenolphthalein solution are added as an indicator and titration is performed using a potassium hydroxide solution. The end point of the titration is when the light crimson color of the indicator lasts about 30 seconds.

(B) Blank Test

Titration is performed in the same manner as in the above operation except that no sample is used (that is, only a mixed solution of toluene/ethanol (2:1) is used).

(3) The result obtained is substituted into the following equation to calculate the acid value.

$$A=[(C-B)\times f\times 5.61]/S$$

Here, A is the acid value (mg KOH/g), B is the addition amount (mL) of the potassium hydroxide solution in the blank test, C is the addition amount (mL) of the potassium hydroxide solution in the main test, f is the factor of the potassium hydroxide solution, and S is the mass of the sample (g).

Method for Measuring Melting Point of Olefin Copolymer Including Ester Group and Olefin Copolymer Including Acid Group The melting point of the olefin copolymer including ester group and the olefin copolymer including acid group is measured according to ASTM D 3418-82 by using a differential scanning calorimeter "Q2000" (manufactured by TA Instruments).

The melting points of indium and zinc are used for temperature correction of the apparatus detection part, and the heat of melting of indium is used for correction of the calorific value.

Specifically, about 3 mg of a sample is accurately weighed and placed in an aluminum pan, and measurement is performed under the following conditions by using an empty aluminum pan as a reference.
Heating rate: 10° C./min
Measurement start temperature: 30° C.
Measurement end temperature: 180° C.

From the obtained DSC curve, the peak temperature of the endothermic peak is taken as the melting point.

Method for Measuring Weight Average Molecular Weight (Mw) and Number Average Molecular Weight (Mn) of Olefin Copolymer Including Ester Group and Olefin Copolymer Including Acid Group The weight-average molecular weight and the number-average molecular weight of the olefin copolymer including ester group and the olefin copolymer including acid group are measured by gel permeation chromatography (GPC) in the following manner.

First, the olefin copolymer including ester group and the olefin copolymer including acid group are dissolved in toluene at 135° C. over 6 h. Then, the obtained solution is filtered through a solvent-resistant membrane filter "Mae Shori Disk" (manufactured by Tosoh Corporation) having a pore diameter of 0.2 μm to obtain a sample solution. The sample solution is adjusted so that the concentration of the component soluble in toluene is about 0.1% by mass. Using this sample solution, the measurement is performed under the following conditions.
Apparatus: HLC-8121 GPC/HT (manufactured by Tosoh Corporation)
Column: TSK gel GMHHR-H HT (7.8 cm I. D×30 cm) 2 series (manufactured by Tosoh Corporation)
Detector: RI for high temperature
Temperature: 135° C.
Solvent: toluene
Flow rate: 1.0 mL/min
Sample: 0.4 mL injection of 0.1% sample A molecular weight calibration curve prepared from a monodisperse polystyrene standard sample is used for calculating the molecular weight of the sample. The molecular weight is then recalculated for polyethylene by a conversion equation derived from a Mark-Houwink viscosity equation.

Method for Measuring Toner Softening Point (Tm)

The softening point is determined by using a constant load extrusion type capillary rheometer "Flow Tester CFT-500D" (manufactured by Shimadzu Corporation) and following the manual attached to the apparatus.

In this apparatus, the temperature of the measurement sample filled in a cylinder is raised to melt the sample while applying a constant load by a piston from above the measurement sample, the melted measurement sample is extruded from the die at the bottom of the cylinder, and a flow curve indicating the relationship between the piston descent amount and the temperature at this time can be obtained.

In the present invention, the "softening point" is defined as "the melting temperature in the ½ method" described in the manual attached to "Flow Characteristic Evaluation Apparatus: Flow Tester CFT-500D".

The melting temperature in the ½ method is calculated in the following manner.

First, ½ of the difference between the descent amount Smax of the piston at the time when the outflow has ended and the descent amount Smin of the piston at the time when the outflow has started is calculated (this is taken as X; X=(Smax−Smin)/2). The temperature at which the descent amount of the piston in the flow curve is the sum of X and Smin is the melting temperature in the ½ method.

About 1.0 g of a sample is compression-molded for about 60 sec at about 10 MPa by using a tablet compacting compressor (for example, NT-100H, manufactured by Energy System Co., Ltd.) in an environment at 25° C. to obtain a columnar shape with a diameter of about 8 mm which is used for the measurement.

Measurement conditions of CFT-500D are as follows.
Test mode: temperature rise method
Start temperature: 50° C.
Temperature reached: 200° C.
Measurement interval: 1.0° C.
Temperature rise rate: 4.0° C./min
Piston cross section area: 1.000 cm$^2$
Test load (piston load): 10.0 kgf (0.9807 MPa)
Preheating time: 300 sec
Die hole diameter: 1.0 mm
Die length: 1.0 mm Method for Measuring Weight Average Particle Diameter (D4) of Toner The weight average particle diameter (D4) of the toner is calculated by using a precision particle diameter distribution measuring apparatus "Coulter Counter Multisizer 3" (registered trademark, manufactured by Beckman Coulter, Inc.) equipped with a 100-μm aperture tube having a pore size and based on a pore electric resistance method and also the dedicated software "Beckman Coulter Multisizer 3 Version 3.51" (manufactured by Beckman Coulter, Inc.) for setting measurement conditions and performing measurement data analysis, performing the measurement with 25,000 effective measurement channels, and analyzing the measurement data.

A solution prepared by dissolving special grade sodium chloride in ion exchanged water to a concentration of about 1% by mass, for example, "ISOTON II" (manufactured by Beckman Coulter, Inc.), can be used as the electrolytic aqueous solution.

The dedicated software is set up in the following manner before the measurement and analysis.

The total count number in a control mode is set to 50,000 particles on a "CHANGE STANDARD MEASUREMENT METHOD (SOM) SCREEN" in the dedicated software, the number of measurements is set to 1, and a value obtained using "standard particles 10.0 μm" (manufactured by Beckman Coulter, Inc.) is set as a Kd value. The threshold and the noise level are automatically set by pressing the measurement button of the threshold/noise level. Further, the current is set to 1600 μA, the gain is set to 2, the electrolytic solution is set to ISOTON II, and "FLUSH OF APERTURE TUBE AFTER MEASUREMENT" is checked.

In the "PULSE TO PARTICLE DIAMETER CONVERSION SETTING SCREEN" of the dedicated software, the bin interval is set to a logarithmic particle diameter, the particle diameter bin is set to a 256-particle diameter bin, and a particle diameter range is set from 2 μm to 60 μm.

A specific measurement method is described hereinbelow.

(1) Approximately 200 mL of the electrolytic aqueous solution is placed in a glass 250 mL round-bottom beaker dedicated to Multisizer 3, the beaker is set in a sample stand, and stirring with a stirrer rod is carried out counterclockwise at 24 rpm. Dirt and air bubbles in the aperture tube are removed by the "FLUSH OF APERTURE" function of the dedicated software.

(2) Approximately 30 ml of the electrolytic aqueous solution is placed in a glass 100 mL flat-bottom beaker. Then, about 0.3 mL of a diluted solution obtained by 3-fold mass dilution of "CONTAMINON N" (10% by mass aqueous solution of a neutral detergent for washing precision measuring instruments of pH 7 consisting of a nonionic surfactant, an anionic surfactant, and an organic builder, manufactured by Wako Pure Chemical Industries, Ltd.) with ion exchanged water is added.

(3) A predetermined amount of ion exchanged water is placed in the water tank of an ultrasonic disperser "Ultrasonic Dispersion System Tetora 150" (manufactured by Nikkaki Bios Co., Ltd.) with an electrical output of 120 W in which two oscillators with an oscillation frequency of 50 kHz are built in with a phase shift of 180 degrees, and about 2 mL of CONTAMINON N is added to the water tank.

(4) The beaker of (2) hereinabove is set in the beaker fixing hole of the ultrasonic disperser, and the ultrasonic disperser is actuated. Then, the height position of the beaker is adjusted so that the resonance state of the liquid surface of the electrolytic aqueous solution in the beaker is maximized.

(5) About 10 mg of the toner is added little by little to the electrolytic aqueous solution and dispersed therein in a state in which the electrolytic aqueous solution in the beaker of (4) hereinabove is irradiated with ultrasonic waves. Then, the ultrasonic dispersion process is further continued for 60 sec. In the ultrasonic dispersion, the water temperature in the water tank is appropriately adjusted to a temperature from 10° C. to 40° C.

(6) The electrolytic aqueous solution of (5) hereinabove in which the toner is dispersed is dropped by using a pipette into the round bottom beaker of (1) hereinabove which has been set in the sample stand, and the measurement concentration is adjusted to be about 5%. Then, measurement is conducted until the number of particles to be measured reaches 50,000.

(7) The measurement data are analyzed with the dedicated software provided with the device, and the weight average particle diameter (D4) is calculated. The "AVERAGE DIAMETER" on the "ANALYSIS/VOLUME STATISTICAL VALUE (ARITHMETIC MEAN)" screen obtained when the graph/(% by volume) is set in the dedicated software is the weight average particle diameter (D4).

Method for Measuring Average Circularity of Toner

The average circulatory of the toner is measured with a flow-type particle image analyzer "FPIA-3000" (manufactured by Sysmex Corp.) under the same measurement and analysis conditions as at the time of calibration operation.

The principle of measurements with the flow-type particle image meter "FPIA-3000" (manufactured by Sysmex Corp.) is in taking a photograph of a flowing particle as a static image and analyzing the static image. The sample added to a sample chamber is taken by a sample suction syringe and fed to a flat sheath flow cell. The sample fed to the flat sheath flow forms a flat flow sandwiched by sheath fluid. The sample passing through the flat sheath flow cell is irradiated by stroboscopic light at intervals of 1/60 sec, and the image of the flowing particle can be captured as a static image. Further, since the flow is flat, focused images are captured. The image of a particle is captured by a CCD camera and the captured image is processed at an image processing resolution of 512×512 pixels (0.37 μm×0.37 μm per pixel) and a projected area S and a perimeter L of a particle image are measured by extracting the contour of each particle image.

Next, the circle-equivalent diameter and circularity are obtained by using the area S and perimeter L. The circle-equivalent diameter refers to the diameter of a circle having the same area as the projected area of a particle image. The circularity is defined as a value obtained by dividing the perimeter of the circle obtained based on the circle-equivalent diameter by the perimeter of the particle projection image and calculated by the following equation.

$$Circularity = 2 \times (\pi \times S)^{1/2} / L$$

When a particle image is circular, the circularity is 1.000. As the degree of unevenness of the periphery of a particle image increases, the circularity decreases. After the circularity of each particle has been calculated, the range of circularity from 0.200 to 1.000 is divided into 800 portions and an arithmetic mean value of the obtained circularities is calculated and taken as the average circularity.

The specific measurement method is as follows.

Initially, about 20 mL of ion exchanged water form which solid impurities, and the like, have been removed in advance is placed in a glass container. Then, about 0.2 mL of a diluted solution prepared by diluting "CONTAMINON N" (a 10 mass % aqueous solution of a neutral detergent which has pH of 7 and used for washing precision measurement devices, the neutral detergent including a nonionic surfactant, an anionic surfactant, and an organic builder; manufactured by Wako Pure Chemical Industries, Ltd.) about three mass times with ion exchanged water is added as a dispersing agent thereto.

About 0.02 g of the measurement sample is then added, and dispersion treatment is performed for 2 min with an ultrasonic disperser to obtain a dispersion liquid for measurements. At that time, the dispersion liquid is suitably cooled such that the temperature thereof is from 10° C. to 40° C. A prescribed amount of ion exchanged water is placed in a water tank followed by the addition of about 2 mL of the CONTAMINON N to the water tank by using a desktop ultrasonic cleaner/disperser having an oscillation frequency of 50 kHz and an electrical output of 150 W ("VS-150" (manufactured by Velvo-Clear Co., Ltd.)) as the ultrasonic disperser.

During the measurements, the aforementioned flow particle image analyzer equipped with a standard object lens (magnification factor: 10 times) is used, and the Particle Sheath "PSE-900A" (manufactured by Sysmex Corp.) is used for the sheath liquid. The dispersion liquid prepared in accordance with the aforementioned procedure is introduced into the flow particle image analyzer and 3000 toner particles are counted in the HPF measurement mode using the total count mode.

The average circularity of the toner is determined by setting the binarized threshold during particle analysis to 85% and limiting the analyzed particle diameter to a circle-equivalent diameter of from 1.98 μm to 39.69 μm.

In the course of the measurements, focus is adjusted automatically using standard latex particles prior to the start of the measurements ("RESEARCH AND TEST PARTICLES, Latex Microsphere Suspensions 5200A" manufactured by Duke Scientific Corp. and diluted with ion exchanged water). Subsequently, focus is preferably adjusted every 2 h after the start of the measurements.

Method for Measuring 50% Particle Diameter (D50), Based on Volume Distribution, of Fine Particles of Olefin Copolymer including Ester Group, Fine Particles of Olefin Copolymer including Acid Group, Amorphous Polyester Resin Fine Particles, Silicone Compound Fine Particles, Aliphatic Hydrocarbon Compound Fine Particles, and Colorant Fine Particles A dynamic light scattering type particle diameter distribution meter Nanotrac UPA-EX150 (manufactured by Nikkiso Co., Ltd.) is used for measuring the 50% particle diameter (d50), based on volume distribution, of fine particles of olefin copolymer including ester group, fine particles of olefin copolymer including acid group, amorphous polyester resin fine particles, silicone compound fine particles, aliphatic hydrocarbon compound fine particles, and colorant fine particles.

In order to prevent the aggregation of the measurement sample (resin fine particles), a dispersion liquid in which the measurement sample has been dispersed in an aqueous solution including FAMILY FRESH (manufactured by Kao Corporation) is added and stirred and then injected into the abovementioned device. The measurement is conducted twice and the average value is found. As the measurement conditions, the measurement time is 30 sec, the sample particle refractive index is 1.49, the dispersion medium is water, and the dispersion medium refractive index is 1.33. The volume particle diameter distribution of the measurement sample is measured and the particle diameter at which the cumulative volume from the small particle diameter side in the cumulative volume distribution becomes 50% is calculated from the measurement result as the 50% particle diameter (D50) based on volume distribution of fine particles.

EXAMPLES

Hereinafter, the present invention will be specifically described based on examples. However, the present invention is not limited to these examples. The parts in the formulations below are on a mass basis unless otherwise specified.

Production Example of Olefin Copolymer including Ester Group 1 ($R_1$=H, $R_2$=H, $R_3$=CH$_3$)

| | |
|---|---|
| Ethylene | 75.2 parts |
| (90.3 mol % based on the total number of moles) | |
| Vinyl acetate | 24.8 parts |
| (9.7 mol % based on the total number of moles) | |
| Isobutyraldehyde (chain transfer agent) | 4.2 parts |
| Di-t-butyl peroxide (radical generating catalyst) | 0.0025 parts |

The above materials were weighed and pumped to a tubular reactor by using a high-pressure pump. Ethylene and vinyl acetate were copolymerized under polymerization conditions of a reaction pressure of 240 MPa and a reaction peak temperature of 250° C. to obtain an olefin copolymer including ester group 1. The olefin copolymer including ester group 1 thus obtained had a weight average molecular weight (Mw) of 110,000, a melting point (Tp) of 86° C., a melt flow rate (MFR) of 12 g/10 min, and an acid value (Av) of 0 mg KOH/g.

Production Examples of Olefin Copolymers Including Ester Group 2 to 6

The olefin copolymers including ester group 2 to 6 were obtained by conducting the reaction in the same manner as in the production example of the olefin copolymer including ester group 1, except that the respective monomers and the number of parts were changed as shown in Table 1. Physical properties are shown in Table 2.

TABLE 1

| Olefin copolymer including ester group | Monomer | | | Monomer | | | Monomer | | |
|---|---|---|---|---|---|---|---|---|---|
| | Type | Mass (parts) | mol [%] | Type | Mass (parts) | mol [%] | Type | Mass (parts) | mol [%] |
| 1 | Et | 75.2 | 90.3 | VA | 24.8 | 9.7 | | | |
| 2 | Et | 66.7 | 86.0 | VA | 33.3 | 14.0 | | | |
| 3 | Et | 94.1 | 98.0 | VA | 5.9 | 2.0 | | | |
| 4 | Et | 63.1 | 84.0 | VA | 36.9 | 16.0 | | | |
| 5 | Et | 97.0 | 99.0 | VA | 3.0 | 1.0 | | | |
| 6 | Et | 59.5 | 84.0 | | | | EA | 40.5 | 16.0 |

The abbreviations in Table 1 are as follows.
Et: ethylene
VA: vinyl acetate
EA: ethyl acrylate

TABLE 2

| Olefin copolymer including ester group | Physical properties | | | |
|---|---|---|---|---|
| | Concentration of ester groups (%) | Mw | $T_p$ [° C.] | Av [mgKOH/g] |
| 1 | 12.7 | 110000 | 86 | 0 |
| 2 | 17.0 | 110000 | 67 | 0 |
| 3 | 3.0 | 110000 | 100 | 0 |
| 4 | 18.9 | 110000 | 65 | 0 |
| 5 | 1.5 | 110000 | 101 | 0 |
| 6 | 17.8 | 110000 | 65 | 0 |

Production Example of Olefin Copolymer Including Acid Group 1

| | |
|---|---|
| Ethylene | 86.1 parts |
| (95.0 mol % based on the total number of moles) | |
| Methacrylic acid | 13.9 parts |
| (5.0 mol % based on the total number of moles) | |

-continued

| | |
|---|---|
| Isobutyraldehyde (chain transfer agent) | 4.2 parts |
| Di-t-butyl peroxide (radical generating catalyst) | 0.0025 parts |

The above materials were weighed and pumped to a tubular reactor by using a high-pressure pump. Ethylene and methacrylic acid were copolymerized under polymerization conditions of a reaction pressure of 240 MPa and a reaction peak temperature of 250° C. to obtain an olefin copolymer including acid group 1. The olefin copolymer including acid group 1 thus obtained had a weight average molecular weight (Mw) of 90,000, a melting point (Tp) of 90° C., a melt flow rate (MFR) of 60 g/10 min, and an acid value (Av) of 90 mg KOH/g.

Production Examples of Olefin Copolymers Including Acid Group 2 to 7

The olefin copolymers including acid group 2 to 7 were obtained by conducting the reaction in the same manner as in the production example of the olefin copolymer including acid group 1, except that the respective monomers and the number of parts were changed as shown in Table 3. Physical properties are shown in Table 4.

Production Example of Dispersion Liquid of Fine Particles of Olefin Copolymer Including Ester Group 1

| | |
|---|---|
| Toluene (manufactured by Wako Pure Chemical Industries, Ltd.) | 300 parts |
| Olefin Copolymer including Ester Group 1 | 100 parts |

The above materials were weighed, mixed and dissolved at 90° C.

Separately, 5.0 parts of sodium dodecylbenzenesulfonate and 10.0 parts of sodium laurate were added to 700 parts of ion exchanged water and dissolved by heating at 90° C. Next, the above toluene solution and aqueous solution were mixed together and stirred at 7000 rpm by using the ultra-high-speed stirring device T. K. ROBOMIX (manufactured by PRIMIX B. V.). Further, emulsification was performed under a pressure of 200 MPa by using a high-pressure impact type disperser NANOMIZER (manufactured by Yoshida Kikai Co., Ltd.). Thereafter, toluene was removed using an evaporator, and the concentration was adjusted with ion exchanged water to prepare an aqueous dispersion liquid

TABLE 3

| Olefin copolymer including acid group | Monomer | | | Monomer | | | Monomer | | | Monomer | | |
|---|---|---|---|---|---|---|---|---|---|---|---|---|
| | Type | Mass (parts) | mol [%] | Type | Mass (parts) | mol [%] | Type | Mass (parts) | mol [%] | Type | Mass (parts) | mol [%] |
| 1 | Et | 86.1 | 95.0 | MA | 13.9 | 5.0 | | | | | | |
| 2 | Et | 88.1 | 95.0 | | | | AA | 11.9 | 5.0 | | | |
| 3 | Et | 83.1 | 95.0 | | | | | | | SA | 16.9 | 5.0 |
| 4 | Et | 92.7 | 98.0 | MA | 7.3 | 2.0 | | | | | | |
| 5 | Et | 50.9 | 80.0 | MA | 49.1 | 20.0 | | | | | | |
| 6 | Et | 96.3 | 99.0 | MA | 3.7 | 1.0 | | | | | | |
| 7 | Et | 47.9 | 78.0 | MA | 52.1 | 22.0 | | | | | | |

The abbreviations in Table 3 are as follows.
Et: ethylene
MA: methacrylic acid
AA: acrylic acid
SA: ethenesulfonic acid

TABLE 4

| Olefin copolymer including acid group | Mw | $T_p$ [° C.] | Av [mgKOH/g] |
|---|---|---|---|
| 1 | 90000 | 90 | 90 |
| 2 | 90000 | 90 | 90 |
| 3 | 90000 | 90 | 90 |
| 4 | 90000 | 92 | 50 |
| 5 | 90000 | 85 | 300 |
| 6 | 90000 | 93 | 40 |
| 7 | 90000 | 84 | 320 | having the concentration of fine particles of olefin copolymer including ester group 1 of 20% by mass (dispersion liquid of fine particles of olefin copolymer including ester group 1).

The 50% particle diameter (D50), based on volume distribution, of the fine particles of olefin copolymer including ester group 1 was 0.40 μm.

Production Example of Dispersion Liquids of Fine Particles of Olefin Copolymer Including Ester Group 2 to 6

Dispersion liquids of the fine particles of olefin copolymer including ester group 2 to 6 were obtained in the same manner as in the production example of the dispersion liquid of the fine particles of olefin copolymer including ester group 1, except that the respective olefin copolymer including ester group was changed as shown in Table 5. Physical properties are shown in Table 5.

TABLE 5

| Dispersion liquid of fine particles of olefin copolymer including ester group | Toluene solution | | | Aqueous solution | | Physical properties D50 [μm] |
|---|---|---|---|---|---|---|
| | Toluene Mass (parts) | Olefin copolymer including ester group | | Sodium dodecylbenzenesulfonate Mass (parts) | Sodium laurate Mass (parts) | |
| | | No. | Mass (parts) | | | |
| 1 | 300 | 1 | 100 | 5 | 10 | 0.4 |
| 2 | 300 | 2 | 100 | 5 | 10 | 0.4 |

TABLE 5-continued

| Dispersion liquid of fine particles of olefin copolymer including ester group | Toluene solution | | | Aqueous solution | | Physical properties D50 [μm] |
| --- | --- | --- | --- | --- | --- | --- |
| | Toluene Mass (parts) | Olefin copolymer including ester group | | Sodium dodecylbenzenesulfonate Mass (parts) | Sodium laurate Mass (parts) | |
| | | No. | Mass (parts) | | | |
| 3 | 300 | 3 | 100 | 5 | 10 | 0.4 |
| 4 | 300 | 4 | 100 | 5 | 10 | 0.4 |
| 5 | 300 | 5 | 100 | 5 | 10 | 0.4 |
| 6 | 300 | 6 | 100 | 5 | 10 | 0.4 |

Production Example of Dispersion Liquid of Fine Particles of Olefin Copolymer Including Acid Group 1

| | |
| --- | --- |
| Toluene (manufactured by Wako Pure Chemical Industries, Ltd.) | 300 parts |
| Olefin Copolymer including Acid Group 1 | 100 parts |

The above materials were weighed, mixed and dissolved at 90° C.

Separately, 5.0 parts of sodium dodecylbenzenesulfonate, 10.0 parts of sodium laurate, and 6.4 parts of N,N-dimethylaminoethanol were added to 700 parts of ion exchanged water and dissolved by heating at 90° C. Next, the above toluene solution and aqueous solution were mixed together and stirred at 7000 rpm by using the ultra-high-speed stirring device T. K. ROBOMIX (manufactured by PRIMIX B. V.). Further, emulsification was performed under a pressure of 200 MPa by using a high-pressure impact type disperser NANOMIZER (manufactured by Yoshida Kikai Co., Ltd.). Thereafter, toluene was removed using an evaporator, and the concentration was adjusted with ion exchanged water to prepare an aqueous dispersion liquid having the concentration of fine particles of olefin copolymer including acid group 1 of 20% by mass (dispersion liquid of fine particles of olefin copolymer including acid group 1).

The 50% particle diameter (D50), based on volume distribution, of the fine particle of olefin copolymer including acid group 1 was 0.40 μm.

Production Example of Dispersion Liquids of Fine Particles of Olefin Copolymer Including Acid Group 2 to 7

Dispersion liquids of the fine particles of olefin copolymer including acid group 2 to 7 were obtained in the same manner as in the production example of the dispersion liquid of the fine particles of olefin copolymer including acid group 1, except that the respective olefin copolymer including acid group was changed as shown in Table 6. Physical properties are shown in Table 6.

TABLE 6

| Dispersion liquid of fine particles of olefin copolymer including acid group | Toluene solution | | | Aqueous solution | | Physical properties D50 [μm] |
| --- | --- | --- | --- | --- | --- | --- |
| | Toluene Mass (parts) | Olefin copolymer including acid group | | Sodium dodecylbenzenesulfonate Mass (parts) | Sodium laurate Mass (parts) | |
| | | No. | Mass (parts) | | | |
| 1 | 300 | 1 | 100 | 5 | 10 | 0.4 |
| 2 | 300 | 2 | 100 | 5 | 10 | 0.4 |
| 3 | 300 | 3 | 100 | 5 | 10 | 0.4 |
| 4 | 300 | 4 | 100 | 5 | 10 | 0.4 |
| 5 | 300 | 5 | 100 | 5 | 10 | 0.4 |
| 6 | 300 | 6 | 100 | 5 | 10 | 0.4 |

Production Example of Dispersion Liquid of Silicone Oil Fine Particles

| | |
| --- | --- |
| Silicone oil (Dimethylsilicone oil manufactured by Shin-Etsu Chemical Co., Ltd.: KF 96-500CS, kinematic viscosity 500 mm$^2$/s) | 100 parts |
| Anionic surfactant NEOGEN RK (manufactured by Dai-ichi Kogyo Seiyaku Co., Ltd.) | 5 parts |
| Ion exchanged water | 395 parts |

The above materials were weighed, mixed, dissolved, and dispersed for about 1 h using a high-pressure impact type disperser NANOMIZER (manufactured by Yoshida Kikai Co., Ltd.) to disperse the silicone oil and obtain an aqueous dispersion liquid (dispersion liquid of silicone oil fine particles) having a concentration of silicone oil fine particles of 20% by mass.

The 50% particle diameter (D50), based on volume distribution, of the silicone oil fine particles was 0.09 μm.

Production Example of Dispersion Liquid of Aliphatic Hydrocarbon Compound Fine Particles

| | |
| --- | --- |
| Aliphatic hydrocarbon compound HNP-51 (manufactured by Nippon Seiro Co., Ltd.) | 100 parts |

| | |
|---|---|
| Anionic surfactant NEOGEN RK (manufactured by Dai-ichi Kogyo Sieyaku Co., Ltd.) | 5 parts |
| Ion exchanged water | 395 parts |

The above materials were weighed and charged into a mixing container equipped with a stirring device, then heated to 90° C. and circulated to CLEARMIX W-Motion (manufactured by M Technique) for dispersion for 60 min. The conditions of the dispersion treatment were as follows.

| | |
|---|---|
| Rotor outer diameter | 3 cm |
| Clearance | 0.3 mm |
| Rotor rotation speed | 19,000 r/min |
| Screen rotation speed | 19,000 r/min |

After the dispersion treatment, the mixture was cooled to 40° C. under cooling treatment conditions of a rotor rotation speed of 1000 r/min, a screen rotation speed of 0 r/min, and a cooling rate of 10° C./min to obtain an aqueous dispersion liquid (dispersion liquid of aliphatic hydrocarbon compound fine particles) with an aliphatic hydrocarbon compound fine particle concentration of 20% by mass.

The 50% particle diameter (D50), based on volume distribution, of the aliphatic hydrocarbon compound fine particles was 0.15 μm.

Production of Dispersion Liquid of Colorant Fine Particles

| | |
|---|---|
| Colorant (cyan pigment manufactured by Dainichiseika Color & Chemicals Mfg. Co., Ltd.: Pigment Blue 15:3) | 50.0 parts |
| Anionic surfactant NEOGEN RK (manufactured by Dai-ichi Kogyo Seiyaku Co., Ltd.) | 7.5 parts |
| Ion exchanged water | 442.5 parts |

The above materials were weighed and mixed, dissolved, and dispersed for about 1 h by using a high-pressure impact type disperser NANOMIZER (manufactured by Yoshida Kikai Co., Ltd.) to disperse the colorant and obtain an aqueous dispersion liquid having a concentration of colorant fine particles of 10% (dispersion liquid of colorant fine particle).

The 50% particle diameter (D50), based on volume distribution, of the colorant fine particles was 0.20 μm.

Production Example of Toner 1

| | |
|---|---|
| Dispersion liquid of fine particles of olefin copolymer including ester group 1: | 300 parts |
| Dispersion liquid of fine particles of olefin copolymer including acid group 1: | 100 parts |
| Dispersion liquid of silicone oil fine particles: | 125 parts |
| Dispersion liquid of aliphatic hydrocarbon compound fine particles: | 150 parts |
| Dispersion liquid of colorant fine particles: | 80 parts |
| Ion exchanged water: | 160 parts |

The above materials were charged into a round stainless steel flask and mixed. Then, 60 parts of a 10% by mass magnesium sulfate aqueous solution was added. Subsequently, the mixture was dispersed for 10 min at 5000 r/min using a homogenizer ULTRA TURRAX T50 (manufactured by IKA). Heating was then performed to 73° C. by using a stirring blade in a heating water bath, while appropriately adjusting the number of revolutions at which the mixture was stirred. After holding at 73° C. for 5 min, the volume average particle diameter of the formed aggregate particles was appropriately confirmed using a Coulter Multisizer III, and it was confirmed that aggregate particles having a weight average particle diameter (D4) of about 5.2 μm were formed.

A total of 330 parts of a 5% aqueous solution of sodium ethylenediamine tetraacetate was added to the dispersion liquid of the aggregate particles, and the mixture was heated to 98° C. while stirring was continued. Then, aggregate particles were fused by holding at 98° C. for 1 hour.

Thereafter, the fused particles were cooled to 50° C. and held for 3 h to promote crystallization of the ethylene-vinyl acetate copolymer.

Then, as a step of removing the divalent metal ions derived from the flocculant, washing with a 5% aqueous solution of sodium ethylenediamine tetraacetate was performed while maintaining the temperature at 50° C.

After subsequent cooling to 25° C., filtration and solid-liquid separation, the filtrate was washed with a 5% aqueous solution of sodium ethylenediamine tetraacetate and further washed with ion exchanged water. After completion of the washing, drying was performed using a vacuum dryer to obtain toner particles 1 having a weight average particle diameter (D4) of about 6.1 μm.

A total of 100 parts of the obtained toner particles 1, 1.0 part of hydrophobic silica fine particles (BET: 200 m$^2$/g) surface-treated with hexamethyldisilazane, and 1.0 part of titanium oxide fine particles (BET: 80 m$^2$/g) surface-treated with isobutyltrimethoxysilane were mixed with a Henschel mixer FM-10C model (manufactured by Mitsui Miike Machinery Co., Ltd.) at a rotation speed of 30 s$^{-1}$ and a rotation time of 10 min to obtain Toner 1. Constituent materials and production method of Toner 1 are shown in Table 7.

Toner 1 had a total metal amount of 350 ppm, a weight average particle diameter (D4) of 6.1 μm, an average circularity of 0.975, and a softening point (Tm) of 90° C. In addition, it was confirmed by the FT-IR-ATR method that Toner 1 had a surface layer including an olefin copolymer including acid group that has formed a salt with the metal. Physical properties of Toner 1 are shown in Table 8.

TABLE 7

| Toner | Dispersion liquid of fine particles of olefin copolymer including ester group No. | Mass (parts) | Dispersion liquid of fine particles of olefin copolymer including acid group No. | Mass (parts) | Flocculant No. | Mass (parts) | Removing agent addition temperature Temperature [° C.] |
|---|---|---|---|---|---|---|---|
| 1  | 1 | 300 | 1 | 100 | 1 | 60   | 50 |
| 2  | 1 | 240 | 1 | 160 | 1 | 48   | 50 |
| 3  | 1 | 360 | 1 | 40  | 1 | 72   | 50 |
| 4  | 1 | 236 | 1 | 164 | 1 | 47.2 | 50 |
| 5  | 1 | 364 | 1 | 36  | 1 | 72.8 | 50 |
| 6  | 2 | 236 | 1 | 164 | 1 | 47.2 | 50 |
| 7  | 3 | 236 | 1 | 164 | 1 | 47.2 | 50 |
| 8  | 4 | 236 | 1 | 164 | 1 | 47.2 | 50 |
| 9  | 5 | 236 | 1 | 164 | 1 | 47.2 | 50 |
| 10 | 4 | 236 | 2 | 164 | 1 | 47.2 | 50 |
| 11 | 4 | 236 | 3 | 164 | 1 | 47.2 | 50 |
| 12 | 4 | 236 | 1 | 164 | 1 | 47.2 | 40 |
| 13 | 4 | 236 | 1 | 164 | 1 | 47.2 | 70 |
| 14 | 4 | 236 | 1 | 164 | 1 | 47.2 | 90 |
| 15 | 4 | 236 | 1 | 164 | 2 | 43.3 | 50 |
| 16 | 4 | 236 | 1 | 164 | 3 | 52   | 50 |
| 17 | 6 | 236 | 1 | 164 | 1 | 47.2 | 50 |
| 18 | 4 | 236 | 4 | 164 | 1 | 47.2 | 50 |
| 19 | 4 | 236 | 5 | 164 | 1 | 47.2 | 50 |
| 20 | 4 | 236 | 1 | 164 | 1 | 47.2 | 30 |
| 21 | 4 | 236 | 1 | 164 | 1 | 47.2 | 98 |
| 22 | 4 | 236 | 6 | 164 | 1 | 47.2 | 50 |
| 23 | 4 | 236 | 7 | 164 | 1 | 47.2 | 50 |
| 24 | 4 | 192 | 1 | 208 | 1 | 47.2 | 50 |
| 25 | 4 | 236 | 1 | 164 | 1 | 47.2 | —  |

Abbreviations in Table 7 are as follows.
Flocculant 1: magnesium sulfate
Flocculant 2: calcium chloride
Flocculant 3: aluminum chloride
The number of parts of the flocculant in the table is the number of parts of a 10% aqueous solution of the respective flocculant.
Removing agent: 5% aqueous solution of sodium ethylenediamine tetraacetate.

TABLE 8

| Toner | Amount of metal (ppm) | Weight average particle diameter D4 (μm) | Average circularity | Carboxylate index (Ge)/(D) | Tm [° C.] |
|---|---|---|---|---|---|
| 1  | 350  | 6.1 | 0.975 | 1.2 | 90 |
| 2  | 400  | 6.1 | 0.975 | 1.5 | 92 |
| 3  | 300  | 6.1 | 0.975 | 1.1 | 88 |
| 4  | 410  | 6.1 | 0.975 | 1.6 | 93 |
| 5  | 290  | 6.1 | 0.975 | 1.1 | 86 |
| 6  | 410  | 6.1 | 0.975 | 1.6 | 86 |
| 7  | 410  | 6.1 | 0.975 | 1.6 | 93 |
| 8  | 410  | 6.1 | 0.975 | 1.6 | 87 |
| 9  | 410  | 6.1 | 0.975 | 1.6 | 94 |
| 10 | 410  | 6.1 | 0.975 | 1.6 | 87 |
| 11 | 300  | 6.1 | 0.975 | 1.1 | 86 |
| 12 | 500  | 6.1 | 0.975 | 2.0 | 94 |
| 13 | 100  | 6.1 | 0.975 | 1.1 | 86 |
| 14 | 25   | 6.1 | 0.975 | 1.0 | 85 |
| 15 | 410  | 6.1 | 0.975 | 1.6 | 87 |
| 16 | 410  | 6.1 | 0.975 | 1.6 | 89 |
| 17 | 410  | 6.1 | 0.975 | 1.6 | 87 |
| 18 | 75   | 6.1 | 0.975 | 1.0 | 85 |
| 19 | 500  | 6.1 | 0.975 | 2.0 | 94 |
| 20 | 600  | 6.1 | 0.975 | 2.1 | 96 |
| 21 | 20   | 6.1 | 0.975 | 0.9 | 84 |
| 22 | 20   | 6.1 | 0.975 | 0.9 | 84 |
| 23 | 500  | 6.1 | 0.975 | 2.0 | 96 |
| 24 | 600  | 6.1 | 0.975 | 2.1 | 97 |
| 25 | 1000 | 6.1 | 0.975 | 2.5 | 100 |

Production Examples of Toners 2 to 25

Toners 2 to 25 were obtained by performing the same operations as in the production example of Toner 1, except that the dispersion liquid of fine particles of olefin copolymer including ester group 1, the dispersion liquid of fine particles of olefin copolymer including acid group 1, the flocculant, and the removing agent addition temperature were changed as shown in Table 7. In the production of Toner 25, no removing agent was added. Physical properties are shown in Table 8.

Production Example of Magnetic Core Particle 1
Step 1 (Weighing and Mixing Step):

| $Fe_2O_3$ | 62.7 parts |
|---|---|
| $MnCO_3$ | 29.5 parts |
| $Mg(OH)_2$ | 6.8 parts |
| $SrCO_3$ | 1.0 part |

The ferrite raw materials were weighed so as to obtain the above composition ratio. Thereafter, pulverizing and mixing were performed for 5 h with a dry vibration mill using stainless steel beads having a diameter of ⅛ inch.

Step 2 (Pre-Baking Step):

The pulverized product thus obtained was made into pellets of about 1 mm square by a roller compactor. The pellets were subjected to removal of coarse powder with a vibration sieve having an opening of 3 mm, and then fine powder was removed with a vibration sieve having an opening of 0.5 mm. Baking was then performed for 4 h at a temperature of 1000° C. in a nitrogen atmosphere (oxygen concentration: 0.01% by volume) by using a burner-type baking furnace to prepare pre-baked ferrite. The composition of the obtained pre-baked ferrite is as follows.

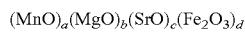

$(MnO)_a(MgO)_b(SrO)_c(Fe_2O_3)_d$

In the above formula, a=0.257, b=0.117, c=0.007, d=0.393.

Step 3 (Pulverization Step):

The obtained pre-baked ferrite was pulverized to about 0.3 mm with a crusher. Then, 30 parts of water was added to 100 parts of the pre-fired ferrite and pulverization was performed with a wet ball mill for 1 h by using ⅛-inch diameter zirconia beads. The obtained slurry was pulverized for 4 h with a wet ball mill using alumina beads having a diameter of 1/16 inch to obtain ferrite slurry (finely pulverized pre-baked ferrite).

Step 4 (Granulation Step):

A total of 1.0 part of ammonium polycarboxylate as a dispersing agent and 2.0 parts of polyvinyl alcohol as a binder were added to the ferrite slurry with respect to 100 parts of the pre-baked ferrite, followed by granulation into spherical particles with a spray drier (manufacturer: Ohkawara Kakohki Co., Ltd.). The obtained particles were adjusted in particle diameter and then heated at 650° C. for 2 h by using a rotary kiln to remove organic components of the dispersing agent and the binder.

Step 5 (Baking Step):

In order to control the baking atmosphere, the temperature was raised from room temperature to a temperature of 1300° C. over 2 h in a nitrogen atmosphere (oxygen concentration 1.00% by volume) in an electric furnace, followed by baking at a temperature of 1150° C. for 4 h. The temperature was then lowered to 60° C. over 4 h, the air atmosphere was restored from the nitrogen atmosphere, and the baked material was taken out at a temperature of 40° C. or lower.

Step 6 (Screening Step):

The aggregated particles were crushed, the low magnetic force product was then cut by magnetic separation, and coarse particles were removed by sieving with a 250 μm sieve to obtain magnetic core particles 1 having a 50% particle diameter (D50), based on volume distribution, of 37.0 μm.

Preparation of Coating Resin 1

| | |
|---|---|
| Cyclohexyl methacrylate monomer | 26.8% by mass |
| Methyl methacrylate monomer | 0.2% by mass |
| Methyl methacrylate macromonomer (a macromonomer with a weight average molecular weight of 5000 which has a methacryloyl group at one end) | 8.4% by mass |
| Toluene | 31.3% by mass |
| Methyl ethyl ketone | 31.3% by mass |
| Azobisisobutyronitrile | 2.0% by mass |

Among the above materials, a cyclohexyl methacrylate monomer, a methyl methacrylate monomer, a methyl methacrylate macromonomer, toluene and methyl ethyl ketone were placed in a four-necked separable flask equipped with a reflux condenser, a thermometer, a nitrogen introduction tube and a stirrer, and nitrogen gas was introduced to make a sufficiently nitrogen atmosphere. Thereafter, the flask was heated to 80° C., azobisisobutyronitrile was added, and reflux polymerization for performed for 5 h. Hexane was injected into the obtained reaction product to precipitate the copolymer, and the precipitate was filtered off and vacuum dried to obtain a coating resin 1.

Next, 30 parts of the coating resin 1 was dissolved in 40 parts of toluene and 30 parts of methyl ethyl ketone to obtain a polymer solution 1 (solid content: 30% by mass).

Preparation of Coating Resin Solution 1

33.3% by mass of polymer solution 1 (resin solid fraction concentration 30%), 66.4% by mass of toluene, and 0.3% by mass of Carbon black Regal 330 (manufactured by Cabot Corp.) (primary particle diameter 25 nm, nitrogen adsorption specific surface area 94 m²/g, DBP oil absorption amount 75 mL/100 g) were dispersed for 1 h with a paint shaker using zirconia beads having a diameter of 0.5 mm. The resulting dispersion liquid was filtered with a membrane filter of 5.0 μm to obtain a coating resin solution 1.

Production Example of Magnetic Carrier 1

Resin Coating Step:

The magnetic core particles 1 and the coating resin solution 1 were charged into a vacuum degassing type kneader maintained at room temperature (the amount of the coating resin solution to be charged was 2.5 parts by weight as a resin component with respect to 100 parts of the magnetic core particle 1). After charging, the components were stirred at a rotation speed of 30 rpm for 15 min. After the solvent was volatilized to a certain level or more (80% by mass), the temperature was raised to 80° C. while mixing under reduced pressure, and toluene was distilled off over 2 h, followed by cooling. A low-magnetic material was sorted from the obtained magnetic carrier by magnetic separation, passed through a sieve with an aperture of 70 μm, and then classified with a wind sifter to obtain a magnetic carrier 1 having a 50% particle diameter (D50), based on volume distribution, of 38.2 μm.

Production Example of Two-Component Developer 1

A total of 92.0 parts of the magnetic carrier 1 and 8.0 parts of the toner 1 were mixed with a V-type mixer (V-20, manufactured by Seishin Enterprise Co., Ltd.) to obtain a two-component developer 1.

Production Examples of Two-Component Developers 2 to 25

Two-component type developers 2 to 25 were obtained by performing the same operations as in the production example of the two-component developer 1, except for making changes such as shown in Table 9.

TABLE 9

| Example or Comparative Example | Two-component developer | Toner | Magnetic carrier |
|---|---|---|---|
| Example 1 | 1 | 1 | 1 |
| Example 2 | 2 | 2 | 1 |
| Example 3 | 3 | 3 | 1 |
| Example 4 | 4 | 4 | 1 |
| Example 5 | 5 | 5 | 1 |
| Example 6 | 6 | 6 | 1 |
| Example 7 | 7 | 7 | 1 |
| Example 8 | 8 | 8 | 1 |
| Example 9 | 9 | 9 | 1 |
| Example 10 | 10 | 10 | 1 |
| Example 11 | 11 | 11 | 1 |
| Example 12 | 12 | 12 | 1 |

TABLE 9-continued

| Example or Comparative Example | Two-component developer | Toner | Magnetic carrier |
|---|---|---|---|
| Example 13 | 13 | 13 | 1 |
| Example 14 | 14 | 14 | 1 |
| Example 15 | 15 | 15 | 1 |
| Example 16 | 16 | 16 | 1 |
| Example 17 | 17 | 17 | 1 |
| Example 18 | 18 | 18 | 1 |
| Example 19 | 19 | 19 | 1 |
| Comparative Example 1 | 20 | 20 | 1 |
| Comparative Example 2 | 21 | 21 | 1 |
| Comparative Example 3 | 22 | 22 | 1 |
| Comparative Example 4 | 23 | 23 | 1 |
| Comparative Example 5 | 24 | 24 | 1 |
| Comparative Example 6 | 25 | 25 | 1 |

Example 1

Evaluation was carried out using the two-component developer 1.

A modified image RUNNER ADVANCE C5560, which is a digital commercial printer manufactured by Canon, was used as an image forming apparatus, and the two-component developer 1 was placed in a developing device at a cyan position. The modification was made to enable free setting of the fixing temperature, the process speed, the DC voltage $V_{DC}$ of the developer carrying member, the charging voltage $V_D$ of the electrostatic latent image carrying member, and the laser power.

In the image output evaluation, an FFh image (solid image) with a desired image ratio was outputted, the $V_{DC}$, $V_D$, and laser power were adjusted to obtain the desired placement amount of the toner of the FFh image, and the evaluation described hereinbelow was performed. The FFh is a value obtained by displaying 256 gradations in hexadecimal notation, 00h is the first gradation of 256 gradations (white background part), and FFh is 256-th gradation (solid part) of 256 gradations.

The evaluation was performed on the basis of the following evaluation method, and the results are shown in Tables 10-1 and 10-2.

Hot Offset Resistance
Paper: CS-680 (68.0 g/m$^2$) (Canon Marketing Japan Co., Ltd.)
Evaluation image: an image of 29 cm×5 cm is arranged at the longitudinal end of the A4 paper
Placement amount of toner on the paper: 0.08 mg/cm$^2$ (FFh image)
(adjusted by the DC voltage $V_{DC}$ of the developer carrying member, the charging voltage $V_D$ of the electrostatic latent image carrying member, and the laser power)
Test environment: normal temperature and low-humidity environment: temperature 23° C./humidity 5% RH (hereinafter referred to as "N/L")
Fixing temperature: 200° C.
Process speed: 377 mm/sec The evaluation image was outputted and hot offset resistance was evaluated. First, after passing 10 plain postcards, the evaluation image was passed. The fogging value was used as an evaluation index of hot offset resistance. The average reflectance Dr (%) of the evaluation paper before paper feeding was measured using a reflectometer (REFLECTOMETER MODEL TC-6DS: manufactured by Tokyo Denshoku Co., Ltd.). Next, the reflectance Ds (%) of the portion where the evaluation image of the white background portion after passing through was hot offset was measured. Then, the fogging value was calculated using the following formula. The fogging value thus obtained was evaluated according to the following evaluation criteria. It was determined that at D or more the effect of the present invention was obtained.

Fogging=$Dr$ (%)–$Ds$(%)

Evaluation Criteria
A: fogging is less than 0.2%
B: fogging is 0.2% to less than 0.5%
C: fogging is 0.5% to less than 0.8%
D: fogging is 0.8% to less than 1.0%
E: fogging is 1.0% or more
Low-Temperature Fixability
Paper: GFC-081 (81.0 g/m$^2$) (Canon Marketing Japan Co., Ltd.)
Placement amount of toner on the paper: 0.50 mg/cm$^2$
(adjusted by the DC voltage $V_{DC}$ of the developer carrying member, the charging voltage $V_D$ of the electrostatic latent image carrying member, and the laser power)
Evaluation image: an image of 2 cm×5 cm is arranged at the center of the A4 paper
Test environment: low-temperature and low-humidity environment: temperature 14° C./humidity 10% RH (hereinafter referred to as "L/L")
Fixing temperature: 150° C.
Process speed: 377 mm/sec The evaluation image was outputted and low-temperature fixability was evaluated. The value of the reduction rate of image density was used as an evaluation index of low-temperature fixability. First, the image density of the center portion was measured using an X-Rite color reflection densitometer (500 series: manufactured by X-Rite Co.). Next, a fixed image was rubbed (five reciprocations) with Silbon paper by applying a load of 4.9 kPa (50 g/cm$^2$) to the portion where the image density was measured, and the image density was measured again. Then, the reduction ratio of the image density after rubbing to that before rubbing was calculated using the following formula. The obtained reduction ratio of image density was evaluated according to the following evaluation criteria. It was determined that at D or more the effect of the present invention was obtained.

Reduction rate of image density=[(image density before rubbing)–(image density after rubbing)]/(image density before rubbing)×100

Evaluation Criteria
A: reduction rate of image density is less than 5.0%
B: reduction rate of image density is 5.0% to less than 8.0%
C: reduction rate of image density is 8.0% to less than 10.0%
D: reduction rate of image density is 10.0% to less than 13.0%
E: reduction rate of image density is 13.0% or more
Transfer Efficiency
Paper: CS-680 (68.0 g/m$^2$) (Canon Marketing Japan Co., Ltd.)
Placement amount of toner on the paper: 0.35 mg/cm$^2$ (FFh image)
(adjusted by the DC voltage $V_{DC}$ of the developer carrying member, the charging voltage $V_D$ of the electrostatic latent image carrying member, and the laser power)
Evaluation image: an image of 2 cm×5 cm is arranged at the center of the A4 paper
Test environment: high-temperature and high-humidity environment: temperature 30° C./humidity 80% RH (hereinafter referred to as "H/H")
Process speed: 377 mm/sec As a stabilization and durability evaluation of the evaluation machine, 10,000 sheets were outputted on A4 paper using a belt chart having an image ratio of 0.1%. Thereafter, the evaluation image was formed on the electrostatic latent image carrying member and transferred to an intermediate transfer member, and the evaluation machine was stopped before the image was transferred to the recording paper. The intermediate transfer member of the stopped evaluation machine was taken out, a transparent pressure-sensitive adhesive tape was stuck on the transferred image to collect the toner, and the toner was affixed to the recording paper together with the pressure-sensitive adhesive tape. The density of the image was measured with an optical density system, and the density of the portion where only the pressure-sensitive adhesive tape was affixed to the recording paper was subtracted to obtain the transfer density A.

Further, the electrostatic latent image carrying member of the evaluation machine was taken out, and the transfer residual density B was also obtained for the transfer residual toner by the same method. As a pressure-sensitive adhesive tape, a transparent Super-Stack (made by Lintec Corporation), which has low pressure-sensitive adhesiveness, was used, and an X-Rite color reflection densitometer (manufactured by X-Rite Co.) was used as an optical densitometer. Then, the transfer efficiency was calculated using the following formula. The obtained transfer efficiency was evaluated according to the following evaluation criteria. It was determined that at D or more the effect of the present invention was obtained.

$$\text{Transfer efficiency} = \{(\text{transfer density } A)/(\text{transfer density } A + \text{transfer residual density } B)\} \times 100$$

Evaluation Criteria
A: transfer efficiency 98.0% or more
B: transfer efficiency 95.0% to less than 98.0%
C: transfer efficiency 92.0% to less than 95.0%
D: transfer efficiency 90.0% to less than 92.0%
E: transfer efficiency less than 90.0%

Charge Retention Property Under High-Temperature and High-Humidity Environment
Paper: GFC-081 (81.0 g/m$^2$) (Canon Marketing Japan Co., Ltd.)
Placement amount of toner on the paper: 0.35 mg/cm$^2$ (FFh image)
(adjusted by the DC voltage $V_{DC}$ of the developer carrying member, the charging voltage $V_D$ of the electrostatic latent image carrying member, and the laser power)
Evaluation image: an image of 2 cm×5 cm is arranged at the center of the A4 paper
Test environment: high-temperature and high-humidity environment: temperature 30° C./humidity 80% RH (hereinafter referred to as "H/H")
Process speed: 377 mm/sec The toner on the latent electrostatic image carrying member was sucked in and collected by using a metal cylindrical tube and a cylindrical filter to calculate the triboelectric charge quantity of the toner.

Specifically, the triboelectric charge quantity of the toner on the electrostatic latent image carrying member was measured by a Faraday-Cage. The Faraday cage is a coaxial double cylinder, and the inner cylinder and the outer cylinder are insulated from each other. Assuming that a charged body with a charge quantity Q is placed in the inner cylinder, it is as if a metal cylinder with a charge quantity Q is present due to electrostatic induction. The induced charge quantity was measured with an electrometer (KEITHLEY 6517A, manufactured by Keithley Co.), and the value (Q/M) obtained by dividing the charge quantity Q (mC) by the toner mass M (kg) in the inner cylinder was taken as the triboelectric charge quantity of toner.

Triboelectric charge quantity of the toner (mC/kg)= Q/M

Initially, the evaluation image was formed on the electrostatic latent image carrying member, the rotation of the electrostatic latent image carrying member was stopped before the image was transferred to the intermediate transfer member, the toner on the electrostatic latent image carrying member was sucked in and collected with a metal cylindrical tube and a cylindrical filter, and the [initial Q/M] was measured.

Then, the developer was allowed to stand for 2 weeks while being left in the evaluation machine in the H/H environment, and then the same operation as before the developer was allowed to stand was carried out to measure the charge quantity Q/M (mC/kg) per unit mass on the electrostatic latent image carrying member. The initial Q/M per unit mass on the above-described initial electrostatic latent image carrying member was taken as 100%, and the retention ratio of Q/M per unit mass on the electrostatic latent image carrying member after the developer was allowed to stand ([Q/M after the developer was allowed to stand]/[initial Q/M]×100) was calculated and determined according to the following criteria. It was determined that at D or more the effect of the present invention was obtained.

Evaluation Criteria
A: retention rate is 95% or more
B: retention rate is 90% to less than 95%
C: retention rate is 85% to less than 90%
D: retention rate is 80% to less than 85%
E: retention rate is less than 80%

Examples 2 to 19 and Comparative Examples 1 to 6

The evaluation was carried out in the same manner as in Example 1 except that two-component developers 2 to 25 were used. Evaluation results are shown in Tables 10-1 and 10-2.

TABLE 10-1

| Examples/Comparative Examples | Low-temperature fixability(%) | | | Hot offset resistance (%) | Fogging |
|---|---|---|---|---|---|
| | Image density before rubbing | Image density after rubbing | Reduction rate | | |
| 1 | A | 1.35 | 1.35 | 0% | A | 0.0% |
| 2 | A | 1.35 | 1.31 | 3% | A | 0.0% |
| 3 | A | 1.35 | 1.35 | 0% | A | 0.1% |
| 4 | B | 1.35 | 1.28 | 5% | A | 0.0% |
| 5 | A | 1.35 | 1.35 | 0% | B | 0.2% |
| 6 | A | 1.35 | 1.33 | 1% | A | 0.1% |
| 7 | B | 1.35 | 1.26 | 7% | A | 0.0% |
| 8 | A | 1.35 | 1.34 | 1% | B | 0.2% |
| 9 | C | 1.35 | 1.23 | 9% | A | 0.0% |
| 10 | A | 1.35 | 1.34 | 1% | B | 0.2% |
| 11 | B | 1.35 | 1.27 | 6% | B | 0.2% |
| 12 | C | 1.35 | 1.24 | 8% | B | 0.2% |
| 13 | A | 1.35 | 1.34 | 1% | C | 0.6% |
| 14 | A | 1.35 | 1.34 | 1% | D | 0.9% |
| 15 | A | 1.35 | 1.34 | 1% | B | 0.2% |
| 16 | C | 1.35 | 1.23 | 9% | B | 0.2% |
| 17 | A | 1.35 | 1.34 | 1% | B | 0.2% |
| 18 | A | 1.35 | 1.34 | 1% | D | 0.9% |
| 19 | D | 1.35 | 1.22 | 10% | B | 0.2% |

TABLE 10-1-continued

| | | Low-temperature fixability(%) | | | | |
|---|---|---|---|---|---|---|
| Examples/ Comparative Examples | | Image density before rubbing | Image density after rubbing | Reduction rate | Hot offset resistance (%) Fogging | |
| 1 | E | 1.35 | 1.16 | 14% | B | 0.2% |
| 2 | A | 1.35 | 1.34 | 1% | E | 1.1% |
| 3 | A | 1.35 | 1.34 | 1% | E | 1.0% |
| 4 | E | 1.35 | 1.17 | 13% | B | 0.2% |
| 5 | E | 1.35 | 1.15 | 15% | B | 0.2% |
| 6 | E | 1.35 | 1.05 | 22% | A | 0.0% |

TABLE 10-2

| Examples/ Comparative Examples | | Transferability (%) | | | Charge retention property (%) | | | |
|---|---|---|---|---|---|---|---|---|
| | | Transfer density A | Transfer residual density B | Transfer efficiency | | Q/M before the developer was allowed to stand | Q/M after the developer was allowed to stand | Retention rate |
| 1 | A | 1.35 | 0.00 | 100% | A | 36 | 36 | 100% |
| 2 | A | 1.35 | 0.00 | 100% | A | 36 | 35 | 97% |
| 3 | A | 1.35 | 0.02 | 99% | A | 36 | 36 | 100% |
| 4 | A | 1.35 | 0.00 | 100% | B | 36 | 33 | 92% |
| 5 | B | 1.35 | 0.04 | 97% | A | 36 | 36 | 100% |
| 6 | A | 1.35 | 0.00 | 100% | B | 36 | 33 | 92% |
| 7 | A | 1.35 | 0.02 | 99% | B | 36 | 34 | 94% |
| 8 | A | 1.35 | 0.00 | 100% | C | 36 | 32 | 89% |
| 9 | B | 1.35 | 0.05 | 96% | B | 36 | 34 | 94% |
| 10 | A | 1.35 | 0.00 | 100% | C | 36 | 32 | 89% |
| 11 | A | 1.35 | 0.01 | 99% | C | 36 | 32 | 89% |
| 12 | A | 1.35 | 0.00 | 100% | D | 36 | 30 | 83% |
| 13 | C | 1.35 | 0.08 | 94% | B | 36 | 33 | 92% |
| 14 | D | 1.35 | 0.13 | 91% | B | 36 | 34 | 94% |
| 15 | A | 1.35 | 0.00 | 100% | C | 36 | 32 | 89% |
| 16 | A | 1.35 | 0.00 | 100% | C | 36 | 32 | 89% |
| 17 | A | 1.35 | 0.00 | 100% | C | 36 | 32 | 89% |
| 18 | D | 1.35 | 0.15 | 90% | B | 36 | 33 | 92% |
| 19 | A | 1.35 | 0.00 | 100% | D | 36 | 29 | 81% |
| 1 | A | 1.35 | 0.00 | 100% | E | 36 | 27 | 75% |
| 2 | E | 1.35 | 0.16 | 89% | B | 36 | 34 | 94% |
| 3 | E | 1.35 | 0.16 | 89% | B | 36 | 34 | 94% |
| 4 | A | 1.35 | 0.00 | 100% | E | 36 | 28 | 78% |
| 5 | A | 1.35 | 0.00 | 100% | E | 36 | 27 | 75% |
| 6 | A | 1.35 | 0.00 | 100% | E | 36 | 26 | 72% |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-198451, filed Oct. 12, 2017, which is hereby incorporated by reference herein in its entirety.

What is claimed is:

1. A toner comprising a toner particle including a resin component, wherein the resin component includes an olefin copolymer including ester group and an olefin copolymer including acid group, the olefin copolymer including ester group has a structure Y1 represented by formula (1) below, and at least one structure Y2 selected from the group consisting of a structure represented by formula (2) below and a structure represented by formula (3) below, the olefin copolymer including acid group has an acid value of from 50 mg KOH/g to 300 mg KOH/g, an amount of the olefin copolymer including ester group is 50% by mass or more based on a total mass of the resin component, the toner particle has a surface layer including the olefin copolymer including acid group which has formed a salt with a metal, the metal is at least one metal selected from the group consisting of Mg, Ca, Sr, Al, and Zn, and a total amount of the metal in the toner is from 25 ppm to 500 ppm on a mass basis:

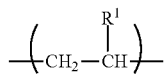

(1)

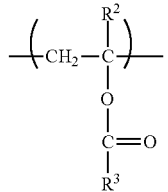

(2)

-continued

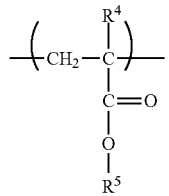
(3)

and wherein $R^1$ represents H or $CH_3$, $R^2$ represents H or $CH_3$, $R^3$ represents $CH_3$ or $C_2H_5$, $R^4$ represents H or $CH_3$, and $R^5$ represents $CH_3$ or $C_2H_5$.

2. The toner according to claim 1, wherein the olefin copolymer including acid group includes a carboxy group.

3. The toner according to claim 1, wherein the olefin copolymer including acid group is an ethylene-acrylic acid copolymer or an ethylene-methacrylic acid copolymer.

4. The toner according to claim 1, wherein an ester group concentration in the olefin copolymer including ester group is from 2.0% by mass to 18.0% by mass based on a total mass of the olefin copolymer including ester group.

5. The toner according to claim 1, wherein an amount of the olefin copolymer including acid group is from 10.0% by mass to 30.0% by mass based on the total mass of the resin component.

6. A method for producing a toner comprising a toner particle including a resin component, the method comprising the steps of:
preparing a resin fine particle dispersion liquid;
adding a flocculant to the resin fine particle dispersion liquid to form aggregate particles; and
heating and fusing the aggregate particles to obtain a dispersion liquid including toner particles, wherein
the resin component contains an olefin copolymer including ester group and an olefin copolymer including acid group,
the olefin copolymer including ester group has a structure Y1 represented by formula (1) below, and at least one structure Y2 selected from the group consisting of a structure represented by formula (2) below and a structure represented by formula (3) below,
the olefin copolymer including acid group has an acid value of from 50 mg KOH/g to 300 mg KOH/g,
an amount of the olefin copolymer including ester group is 50% by mass or more based on a total mass of the resin component,
the toner particle has a surface layer including the olefin copolymer including acid group which has formed a salt with a metal,
the metal is at least one metal selected from the group consisting of Mg, Ca, Sr, Al, and Zn, and
a total amount of the metal in the toner is from 25 ppm to 500 ppm on a mass basis:

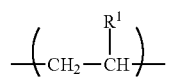
(1)

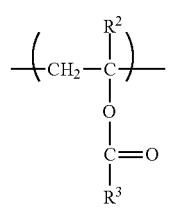
(2)

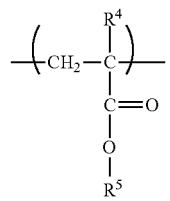
(3)

and wherein $R^1$ represents H or $CH_3$, $R^2$ represents H or $CH_3$, $R^3$ represents $CH_3$ or $C_2H_5$, $R^4$ represents H or $CH_3$, and $R^5$ represents $CH_3$ or $C_2H_5$.

7. The method for producing a toner according to claim 6, wherein the flocculant is a metal salt including at least one metal selected from the group consisting of Mg, Ca, Sr, Al, and Zn.

8. The method for producing a toner according to claim 6, the method further comprising a step of adding a chelate compound having a chelating ability with respect to metal ions to the dispersion liquid including toner particles to remove the metal.

* * * * *